United States Patent
Takehara et al.

(10) Patent No.: US 10,822,463 B2
(45) Date of Patent: Nov. 3, 2020

(54) RESIN SUPPLY MATERIAL, PREFORM, AND METHOD OF PRODUCING FIBER-REINFORCED RESIN

(71) Applicant: Toray Industries, Inc., Tokyo (JP)

(72) Inventors: Tomohiro Takehara, Ehime (JP); Satoshi Seike, Nagoya (JP); Masato Honma, Ehime (JP); Takashi Fujioka, Ehime (JP); Satomi Hiasa, Ehime (JP)

(73) Assignee: Toray Industries, Inc., Tokyo (JP)

( * ) Notice: Subject to any disclaimer, the term of this patent is extended or adjusted under 35 U.S.C. 154(b) by 283 days.

(21) Appl. No.: 15/553,788

(22) PCT Filed: Feb. 24, 2016

(86) PCT No.: PCT/JP2016/055377
§ 371 (c)(1),
(2) Date: Aug. 25, 2017

(87) PCT Pub. No.: WO2016/136790
PCT Pub. Date: Sep. 1, 2016

(65) Prior Publication Data
US 2018/0066118 A1 Mar. 8, 2018

(30) Foreign Application Priority Data

Feb. 27, 2015 (JP) .................. 2015-037931
Feb. 27, 2015 (JP) .................. 2015-038132
Feb. 27, 2015 (JP) .................. 2015-038133

(51) Int. Cl.
*C08J 5/04* (2006.01)
*C08J 5/24* (2006.01)
*B29B 11/16* (2006.01)

(52) U.S. Cl.
CPC ............... *C08J 5/04* (2013.01); *B29B 11/16* (2013.01); *C08J 5/24* (2013.01)

(58) Field of Classification Search
CPC ..... C08J 5/04; C08J 5/24; B29C 70/80; B29C 70/50; Y10T 428/24994; B29B 11/16
(Continued)

(56) References Cited

U.S. PATENT DOCUMENTS 9,539,742 B2    1/2017  Jung et al.
2011/0143110 A1 6/2011  Tsuchiya et al.
(Continued)

FOREIGN PATENT DOCUMENTS

CN    104080841 A    10/2014
EP    3 263 332 A1    1/2018
(Continued)

OTHER PUBLICATIONS

Modulus of Elasticity of some common Materials, accessed online Oct. 22, 2019.*
(Continued)

*Primary Examiner* — Camie S Thompson
(74) *Attorney, Agent, or Firm* — DLA Piper LLP (US)

(57) ABSTRACT

A resin supply material is used for molding a fiber-reinforced resin and includes a continuous porous material and a resin. The continuous porous material has a bending resistance Grt of 10 mN·cm or more at 23° C., and a bending resistance ratio Gr of 0.7 or less, the bending resistance ratio Gr being expressed by the formula:

$Gr = Gmt/Grt$

Gmt: bending resistance of continuous porous material at 70° C.

13 Claims, 2 Drawing Sheets

(58) Field of Classification Search
USPC .................................. 428/213, 220, 292.1
See application file for complete search history.

(56) References Cited

U.S. PATENT DOCUMENTS

| | | |
|---|---|---|
| 2012/0012263 A1 | 1/2012 | Tsuchiya et al. |
| 2015/0000829 A1 | 1/2015 | Jung et al. |
| 2018/0044488 A1 | 2/2018 | Takehara et al. |

FOREIGN PATENT DOCUMENTS

| | | |
|---|---|---|
| EP | 3 263 632 A1 | 1/2018 |
| JP | 2002-234078 | 8/2002 |
| JP | 2003-011231 | 1/2003 |
| JP | 2003-071856 | 3/2003 |
| JP | 2006-305867 | 11/2006 |
| JP | 2007-260930 | 10/2007 |
| JP | 2008-174605 | 7/2008 |
| JP | 2008-246981 | 10/2008 |
| JP | 2011-157638 | 8/2011 |
| JP | 2012-255065 | 12/2012 |
| JP | 2013-056985 | 3/2013 |
| TW | 201637829 A | 11/2016 |
| WO | 2010/013645 A1 | 7/2009 |

OTHER PUBLICATIONS

The Engineering ToolBox, Young's Modulus—Tensile and Yield Strength of some common Materials, accessed online Apr. 19, 2020.*

Extended European Search Report dated Mar. 25, 2019, of counterpart European Application No. 16755534.1.

The First Office Action dated Oct. 21, 2019, of counterpart Chinese Application No. 201680012344.1, along with an English translation.

* cited by examiner

FIG.2(iii)

FIG.3(iii)
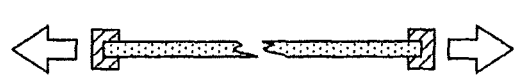

RESIN SUPPLY MATERIAL, PREFORM, AND METHOD OF PRODUCING FIBER-REINFORCED RESIN

TECHNICAL FIELD

This disclosure relates to a resin supply material, a preform, and a method of producing a fiber-reinforced resin.

BACKGROUND

Fiber-reinforced resins have an excellent specific strength and specific rigidity and are, therefore, widely used in applications such as aircraft, automobiles, sports and electric and electronic components. In recent years, fiber-reinforced resins have been increasingly used in industrial fields such as windmill blades, pressure vessels and building reinforcing materials. Particularly in industrial applications such as automobiles and electric and electronic components, demand for high-speed molding processes for fiber-reinforced resins is growing. In electric and electronic component applications, the amount of heat generated from the components has been increasing with size reduction and improvement of performance. When the amount of heat generated from an electronic component increases, the temperature in the electronic component or a device is elevated, and the associated heat may deteriorate the functions of the electronic component or the device, or cause erroneous operations or damage. Thus, a material having an excellent thermal conductivity is desired.

Methods of high-speed molding of a fiber-reinforced resin include a RTM (resin transfer molding) method (Japanese Patent Laid-open Publication No. 2003-71856) and a RFI (resin film infusion) method (Japanese Patent Laid-open Publication No. 2003-11231). In the RTM method, first, a dry base material (reinforcing fiber base material which does not contain a resin) is formed into a predetermined shape to produce a preform, the preform is disposed in a metal mold, and a liquid thermosetting resin having a low viscosity is injected into the metal mold, and heated and cured to mold a FRP (fiber-reinforced plastic) member. Since a dry base material is used, a three-dimensional complicated shape can be formed. In the RTM method, however, a process of injecting a resin is necessary and, therefore, molding subsidiary materials to be used in the injection process such as tubes and pipes are required. In addition, all the resin is not consumed for production of a molded article, and a large amount of the resin is wastefully left in an injection channel, resulting in an increase in cost. In a thermosetting resin, the resin cannot be reused, and cleaning in each batch requires lots of labor, resulting in an increase in cost. The RTM method also has the disadvantage that an injection port or a suction port leaves its trace on a molded member. Moreover, the RTM method has the problem that an operation site is often contaminated by a resin leaked out from a container or a pipe because a resin that is liquid at room temperature is used.

In the RFI method, a reinforcing fiber base material, and a resin film composed of an uncured thermosetting resin are disposed in a mold, and the resin film is melted by heating to be impregnated into the reinforcing fiber base material, and is then cured. Unlike the RTM method, the RFI method does not involve a thermosetting resin that is liquid at room temperature. Therefore, in the RFI method, an operation site is rarely contaminated, and time and labor for resin formulation can be saved. However, the RFI method has the problem that a thermosetting resin to be used in the RFI method has low rigidity in the form of a film and is, therefore, poor in handling characteristic so that lots of time and labor are required for disposing the film in a mold.

Japanese Patent Laid-open Publication No. 2002-234078 and Japanese Patent Laid-open Publication No. 2006-305867 each suggest a method of molding a fiber-reinforced resin using an impregnated body (described as a resin support in Japanese Patent Laid-open Publication No. 2002-234078 or a preform in Japanese Patent Laid-open Publication No. 2006-305867) in which a thermosetting resin that is liquid at room temperature is absorbed into a support. Japanese Patent Laid-open Publication No. 2008-246981 suggests a method of molding a fiber-reinforced resin using a SMC (sheet molding compound).

In Japanese Patent Laid-open Publication No. 2002-234078 and Japanese Patent Laid-open Publication No. 2006-305867, a structural member can be produced by laminating a resin-containing impregnated body with a dry base material, then heating and pressurizing the resulting laminate in a mold to impregnate a reinforcing fiber base material with a thermosetting resin in the impregnated body, and also the impregnated body may be excellent in handling characteristic because a support is impregnated with a resin. However, the dynamic characteristics of the support to be used are not specified, and there is the problem that in application of a tensile force during conveyance or lamination of the support, the support is ruptured or deformed, leading to generation of wrinkles. When such a support having poor dynamic characteristics exists in a fiber-reinforced resin, the dynamic characteristics of the fiber-reinforced resin may be deteriorated. There is also the problem that the impregnated body to be used has a low thermal conductivity, and thus the resulting fiber-reinforced resin does not attain desired properties. Further, there is the problem that since the impregnated body to be used has a low thermal conductivity, temperature unevenness occurs in a material during molding, or much time is required for molding of a thick article.

The molding method in Japanese Patent Laid-open Publication No. 2008-246981 is used for the purpose of obtaining a molded article with smoothed proper external appearance quality by interposing a resin-non-impregnated base material between prepreg layers to suppress generation of depressions on a surface of the molded article. Thus, the prepreg has a high fiber content, and a small fiber content change ratio before and after molding. It is difficult to use a non-impregnated base material with a high weight per unit area to improve the dynamic characteristics of the fiber-reinforced resin, or to apply a resin supply material to uneven-thickness molding.

It could therefore be helpful to provide a resin supply material excellent in handling characteristic, resin support characteristic and dynamic characteristics as a fiber-reinforced resin, and a method of producing a fiber-reinforced resin using the resin supply material.

It could also be helpful to provide a resin supply material excellent in resin support characteristics, handling characteristic and thermal conductivity, and a method of producing a fiber-reinforced resin using the resin supply material.

SUMMARY

Our resin supply material may be a resin supply material used to mold a fiber-reinforced resin, the resin supply material including a continuous porous material and a resin, wherein the continuous porous material has a bending resistance Grt of 10 mN·cm or more at 23° C., and a bending resistance ratio Gr of 0.7 or less, the bending resistance ratio Gr being expressed by the following formula.

$$Gr = Gmt/Grt$$

Gmt: bending resistance of continuous porous material at 70° C.

A resin supply material may be a resin supply material used to mold a fiber-reinforced resin, the resin supply material including a continuous porous material and a resin, wherein the continuous porous material has a tensile strength σrt of 0.5 MPa or more at 23° C., and a tensile strength ratio σr of 0.5 or more, the tensile strength ratio σr being expressed by the following formula.

$$\sigma r = \sigma mt/\sigma rt$$

σmt: tensile strength of continuous porous material at 130° C.

A resin supply material may be a resin supply material used to mold a fiber-reinforced resin, the resin supply material including a continuous porous material and a resin, wherein a thermal conductivity of a material that forms the continuous porous material is 1.2 W/m·K or more, and/or the resin supply material including a continuous porous material, a resin and a filler, wherein a thermal conductivity of the filler is 1.2 W/m·K or more.

A preform includes the resin supply material and a base material.

A method of producing a fiber-reinforced resin includes molding a fiber-reinforced resin by heating and pressurizing the preform to supply the resin from the resin supply material to the base material.

There can be provided a resin supply material excellent in handling characteristic, resin support characteristic and dynamic characteristics as a fiber-reinforced resin, and a method of producing a fiber-reinforced resin using the resin supply material.

There can also be provided a resin supply material excellent in resin support characteristic, handling characteristic and thermal conductivity, and a method of producing a fiber-reinforced resin using the resin supply material.

DESCRIPTION OF REFERENCE SIGNS

1: Resin supply material
2: Base material
3: Preform
4: Arm
5: Continuous porous material
6: Claw
7: Clamp
8: Cantilever-type tester
9: Plumb
P: Front end of platform

DETAILED DESCRIPTION

Construction

Figure 1:
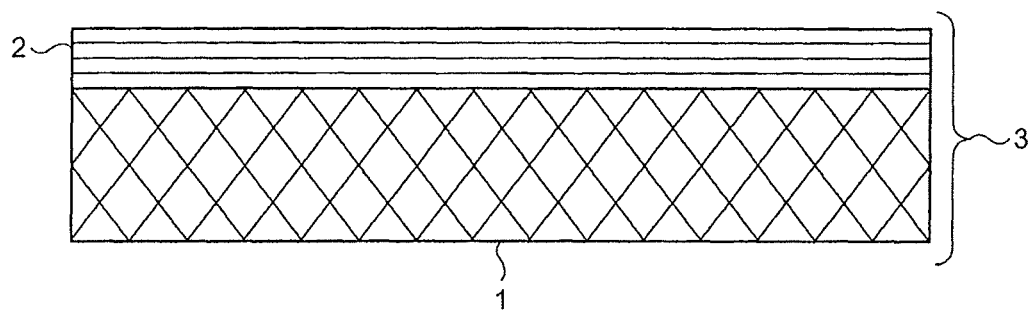
FIG. 1 is schematic view showing a configuration of a resin supply material.

We provide a resin supply material including a continuous porous material and a resin. As shown in FIG. 1, we also provide a preform 3 including such a resin supply material 1 and a base material 2, and a method for producing a fiber-reinforced resin using the preform 3. First, the constituent materials will be described.

Continuous Porous Material

To exhibit a handling characteristic in the resin supply material 1, the continuous porous material is required to have a bending resistance Grt of 10 mN·cm or more at 23° C., and a bending resistance ratio Gr of 0.7 or less. The bending resistance ratio Gr will be described later.

The "continuous porous material" refers to a porous material in which included pores are mutually connected, and the porous material is permeable to a gas such as air or a liquid such as water in the thickness direction or the porous material. Whether or not the porous material is permeable to a gas or a liquid can be determined in accordance with JIS-L1096 (2010) "Method for Testing Cloths of Woven and Knitted Fabrics" and JIS-R1671 (2006) "Method for Testing Water Permeability and Hydraulic Power Equivalent Diameter Test Method".

The "bending resistance" is a degree of resistance of a continuous porous material to deformation in evaluation performed in reference to a method for measurement of a bending resistance as specified in JIS-L1913 (2010) "Method for Testing General Non-Woven Fabrics". The "bending resistance ratio" is a ratio of a bending resistance Gmt at 70° C. and a bending resistance Grt at 23° C., and can be expressed by the following formula.

$$Gr = Gmt/Grt$$

Figure 2I:
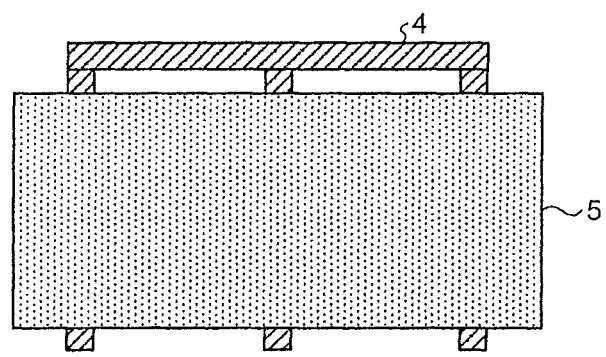
FIG. 2 (i)-(iii) are schematic views showing a situation in which a continuous porous material is conveyed, a schematic view showing when a continuous porous material that meets our requirements is used, and a schematic view showing when a continuous porous material that does not meet our requirements is used.
Figure 2:
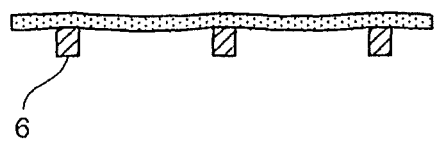

When operations of conveyance and lamination of a continuous porous material 5 and the resin supply material 1, or the preform 3 including the continuous porous material 5 and the resin supply material 1 are performed using an arm 4 as shown in FIG. 2(i), the resin supply material 1 has a reduced amount of deformation and thus the conveyance and lamination operations can be easily performed when the continuous porous material 5 has a high bending resistance (FIG. 2(ii)). When the continuous porous material 5 having a low bending resistance is used, the resin supply material 1 is considerably deformed as shown in FIG. 2(iii), and to prevent contact between the continuous porous material 5 and other material, it may be necessary to enlarge a clearance between the arm 4 and other material or increase the number of claws 6 of the arm 4, resulting in an increase in apparatus size. Thus, to improve the handling characteristic, the bending resistance of the continuous porous material at 23° C. is preferably 30 mN·cm or more, more preferably 50 mN·cm or more.

The bending resistance Gmt at 70° C. represents a degree of ease with which the resin supply material 1 including a continuous porous material and a resin or the preform 3 including the resin supply material 1 follows the shape of a metal mold, and the bending resistance ratio Gr (=Gmt/Grt)

is required to be 0.7 or less. Use of the resin supply material 1 including a continuous porous material and a resin as described above makes it possible to provide the resin supply material 1 having all characteristics required in preparation of a fiber-reinforced resin that exhibits a high handling characteristic during conveyance and lamination and is flexible enough to exhibit a high shape-imparting characteristic during shape impartment.

The bending strength is calculated from a bending length and a weight per unit area. When there is no difference in bending length between continuous porous materials, a continuous porous material having a larger weight per unit area has a higher bending resistance, is thus capable of holding a larger amount of resin and is, therefore, more favorable. When there is no difference in weight per unit area, a continuous porous material having a larger bending length has a higher bending resistance and, hence, a higher handling characteristic and is, therefore, more favorable. A bending length Crt at 23° C. is preferably 5 cm or more, more preferably 8 cm or more, still more preferably 10 cm or more from the viewpoint of a handling characteristic.

Figure 3I:
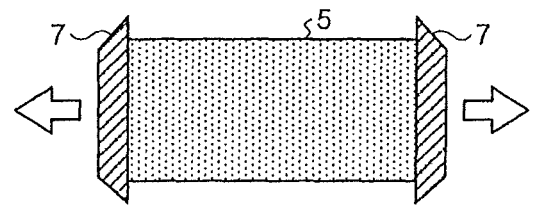
FIG. 3 (i)-(iii) are schematic views showing a situation in which a continuous porous material is conveyed, a schematic view showing when a continuous porous material that meets our requirements is used, and a schematic view showing when a continuous porous material that does not meet our requirements is used.
Figure 3:

The minimum tensile strength σmin of the continuous porous material is preferably 3 MPa or more, and to prevent the continuous porous material 5 from being ruptured by a tensile force or self-weight (FIG. 3(iii)), for example, in conveyance of the continuous porous material 5 with its both ends held by a clamp 7 as shown in FIG. 3(i), the minimum tensile strength min is more preferably 5 MPa or more, still more preferably 8 MPa or more. When such a material is used, it is possible to apply a high tensile force at the time of holding the continuous porous material, and in the preform 3 including the resin supply material 1, it is possible to dispose a large number of base materials 2 so that the degree of design freedom can be improved.

A tensile strength ratio σr (=σo/σmin) of the minimum tensile strength σmin of the continuous porous material and a tensile strength σo in a direction orthogonal to a direction in which the continuous porous material has the minimum tensile strength is preferably 1.0 to 1.2. Such a continuous porous material eliminates the necessity to consider a direction of materials during lamination so that the degree of design freedom and productivity can be improved and the resulting fiber-reinforced resin can exhibit isotropic dynamic characteristics. The tensile strength ratio is more preferably 1.0 to 1.1, still more preferably 1.0 to 1.05.

Preferably, the continuous porous material is formed of reinforcing fibers. The reinforcing fiber is not particularly limited, but the reinforcing fiber is preferably a fiber composed of a material having dynamic characteristics higher than those of a resin serving as a matrix resin. Specific examples may include resin fibers such as fibers of polyphenylene sulfide, polyamide, polycarbonate and polyimide, glass fibers, carbon fibers, aramid fibers and metal fibers. The reinforcing fiber is more preferably at least one selected from a glass fiber, a carbon fiber, an aramid fiber and a metal fiber among the fibers listed above. Among these reinforcing fibers, carbon fibers are still more preferred. The kind of carbon fibers is not particularly limited and, for example, polyacrylonitrile (PAN)-based carbon fibers, pitch-based carbon fibers and rayon-based carbon fibers can be preferably used from the viewpoint of an effect of reducing the weight of the fiber-reinforced resin. One kind of the carbon fibers, or a combination of two or more kinds of the carbon fibers may be used. Among them, PAN-based carbon fibers are further preferred from the viewpoint of a balance between the strength and the elastic modulus of the resulting fiber-reinforced resin. The monofilament diameter of the reinforcing fibers is preferably 0.5 μm or more, more preferably 2 μm or more, still more preferably 4 μm or more. The monofilament diameter of the reinforcing fibers is preferably 20 μm or less, more preferably 15 μm or less, still more preferably 10 μm or less. The strand strength of the reinforcing fibers is preferably 3 GPa or more, more preferably 4 GPa or more, still more preferably 4.5 GPa or more. The strand elastic modulus of the reinforcing fibers is preferably 200 GPa or more, more preferably 220 GPa or more, still more preferably 240 GPa or more.

The reinforcing fiber may be a continuous fiber to be used in a unidirectional base material, a fabric base material or the like, but the reinforcing fiber is preferably a discontinuous fiber from the viewpoint of a resin supply characteristic. The reinforcing fiber is preferably in the form of a web in which fibers are dispersed in a bundle shape or a monofilament shape, and gaps to be impregnated with a resin exist between the fibers. The form and the shape of the web are not limited and, for example, reinforcing fibers may be mixed with organic fibers, an organic compound or an inorganic compound, reinforcing fibers may be sealed together by other component, or reinforcing fibers may be bonded to a resin component. As a preferred form to easily produce a web in which fibers are dispersed, mention may be made of, for example, a base material in the form of a non-woven fabric obtained by a dry method or a wet method and in which reinforcing fibers are sufficiently opened, and monofilaments are bonded together by a binder composed of an organic compound.

Preferably, fibers in the continuous porous material formed of reinforcing fibers that are preferably used are bonded together by a binder. Accordingly, the handling characteristic and productivity and workability are improved, and the network structure of the continuous porous material can be retained. The binder is not particularly limited, and examples of the binder that is preferably used include thermoplastic resins such as polyvinyl alcohol, ethylene-propylene copolymers, ethylene-vinyl acetate copolymers, polyvinyl chloride, polyvinylidene chloride, polyvinyl acetate, polycarbonate resins, styrene-based resins, polyamide-based resins, polyester-based resins, polyphenylene sulfide resins, modified polyphenylene ether resins, polyacetal resins, polyetherimide resins, polypropylene resins, polyethylene resins, fluororesins, thermoplastic acrylic resins, thermoplastic polyester resins, thermoplastic polyamideimide resins, acrylonitrile-butadiene copolymers, styrene-butadiene copolymers and acrylonitrile-styrene-butadiene copolymers; and thermosetting resins such as urethane resins, melamine resins, urea resins, thermosetting acrylic resins, phenol resins, epoxy resins and thermosetting polyester. A resin having at least one functional group selected from an epoxy group, a hydroxy group, an acrylate group, a methacrylate group, an amide group, a carboxyl group, a carboxylic acid, an acid anhydride group, an amino group and an imine group is preferably used from the viewpoint of the dynamic characteristics of the resulting fiber-reinforced resin. These binders may be used alone, or in combination of two or more thereof. The attaching amount of the binder is preferably 0.01% or more, more preferably 0.1% or more, still more preferably 1% or more. The attaching amount of the binder is preferably 20% or less, more preferably 15% or less, still more preferably 10% or less. When the attaching amount of the binder is more than 20%, much time may be required in a drying process, or resin impregnability may be deteriorated. When the attaching amount of the binder is less than 0.01%, it may be difficult to maintain the form of a web composed of reinforcing fibers, leading to deterioration of the handling characteristic when the web is used in the continuous porous material. The attaching amount of the binder can be measured from a mass difference before and after application of the binder or by a burning method.

The mean fiber length of the reinforcing fibers is preferably 0.1 mm or more, more preferably 1 mm or more, still more preferably 2 mm or more. The mean fiber length of reinforcing fibers is not particularly limited, but it is preferably 100 mm or less, more preferably 50 mm or less, still more preferably 10 mm or less from the viewpoint of isotropy of the continuous porous material and dispersibility of the reinforcing fibers. Examples of the method of measuring the mean fiber length include a method in which reinforcing fibers are directly extracted from a reinforcing fiber base material; and a method in which a prepreg is dissolved using a solvent capable of dissolving only a resin of the prepreg, and the remaining reinforcing fibers are separated by filtration, and measured by microscopic observation (dissolution method). When a solvent capable of dissolving a resin is not available, mention is made of, for example, a method in which only the resin is burned off in a temperature range over which the oxidative weight loss of reinforcing fibers does not occur, and the reinforcing fibers are separated, and measured by microscopic observation (burning method). The measurement can be performed by randomly selecting 400 reinforcing fibers, determining the lengths of the reinforcing fibers to the order of 1 μm using an optical microscope, and determining fiber lengths and ratios thereof. In a comparison between the method in which reinforcing fibers are directly extracted from a reinforcing fiber base material and the method in which reinforcing fibers are extracted from a prepreg by a burning method or a dissolution method, there is no significant difference between the results obtained by the former method and the latter method as long as conditions are appropriately selected.

A mass per unit area (weight per unit area) of the continuous porous material is preferably 10 g/m² or more, more preferably 100 g/m² or more, still more preferably 300 g/m² or more. When the mass per unit area is less than 1 g/m², the resin support characteristic may be deteriorated, thus making it unable to hold an amount of resin required for molding. Further, in the process of producing the resin supply material 1, the handling characteristic may be poor, leading to deterioration of workability.

Resin

An elastic modulus Ert of a resin at 23° C. is preferably 1 MPa or more, and the elastic modulus Ert is more preferably 3 MPa or more, still more preferably 5 MPa or more from the viewpoint of the handling characteristic of the resin supply material 1 at 23° C.

The kind of resin is not particularly limited, and either a thermosetting resin or a thermoplastic resin can be used. As the thermosetting resin, at least one selected from an epoxy resin, a vinyl ester resin, a phenol resin, a thermosetting polyimide resin, a polyurethane resin, a urea resin, a melamine resin and a bismaleimide resin. In addition to a single epoxy resin, a copolymer of an epoxy resin and a thermosetting resin, a modified product, a resin obtained by blending two or more kinds of resins and so on can be used. As the thermoplastic resin, at least one selected from polypropylene, polyethylene, polycarbonate, polyamide, polyester, polyarylene sulfide, polyphenylene sulfide, polyether ketone, polyether ether ketone, polyether ketone ketone, polyether sulfone, polyimide, polyamideimide, polyether imide and polysulfone is preferably used. A cyclic oligomer that is a precursor of any of these resins is also preferably used.

Like the continuous porous material, the resin is preferably one that has a favorable handling characteristic at 23° C. and that is soft enough to easily impart a shape during shape impartment. Preferably, the resin has a lower elastic modulus at 70° C. than at 23° C.

The viscosity of the resin during impregnation (molding) is preferably 1000 Pa·s or less, more preferably 100 Pa·s or less, still more preferably 10 Pa·s or less. When the viscosity is more than 1000 Pa·s, the resulting fiber-reinforced resin may have non-impregnated portions and voids because the later-described base material 2 is not sufficiently impregnated with the resin.

Resin Supply Material

The resin supply material 1 is required to be excellent in handling characteristic and shape-imparting characteristic during conveyance and lamination in a state of the resin supply material 1 alone or the preform 3 including the base material 2, and the resin supply material 1 is also required to hold a resin serving as a matrix resin for the fiber-reinforced resin, and supply the resin to the base material 2 during molding. A resin mass change ratio P in the resin supply material 1 before and after molding as expressed by the following formula is preferably 0.03 or more, more preferably 0.05 or more, still more preferably 0.08 or more. For causing the resin to flow from the resin supply material 1 to the base material 2 so that a fiber-reinforced resin having a reduced number of voids is obtained, the change ratio P is preferably 0.99 or less, more preferably 0.7 or less, still more preferably 0.5 or less. A mass of resin Wr1 in the resin supply material 1 before molding and a mass of resin Wr2 in the resin supply material 1 after molding are determined in accordance with JIS K7075 (1991) "Fiber Content and Void Content Test Methods for Carbon Fiber-Reinforced Plastic". In the preform 3 including the resin supply material 1, the resin weights Wr1 and Wr2 can be determined in accordance with JIS K7075 (1991) "Fiber Content and Void Content Test Methods for Carbon Fiber-Reinforced Plastic" using only a resin supply material (A) taken out by polishing or cutting the preform.

$$P = Wr2/Wr1$$

Wr1: mass of resin (g) in resin supply material before molding

Wr2: mass of resin (g) in resin supply material after molding

By using this resin supply material 1, the resin can be supplied to a larger amount of the base material 2 so that the degree of design freedom and dynamic characteristics of the fiber-reinforced resin can be improved.

A volume content change ratio Q in continuous porous material in the resin supply material 1 before and after molding as expressed by the following formula is preferably 1.1 or more, more preferably 1.3 or more, still more preferably 1.5 or more for causing the resin to flow from the resin supply material 1 to the base material 2 so that a fiber-reinforced resin having a reduced number of voids is molded. To minimize outflow of the resin so that the resin efficiently flows from the resin supply material 1 to the base material 2, the change ratio Q is preferably 30 or less, more preferably 15 or less, still more preferably 5 or less. A volume content Vpt of the continuous porous material after molding is determined in accordance with JIS K7075 (1991) "Fiber Content and Void Content Test Methods for Carbon Fiber-Reinforced Plastic". In place of the above-mentioned method for determining the volume content Vpt, the volume content Vpt may be determined from the following formula using a thickness T (unit: mm, measured value), a weight per unit area Faw of the continuous porous material (unit: g/m$^2$, catalog value or measured value), and a density ρ of the continuous porous material (unit: g/cm$^3$, catalog value or measured value). The thickness T is determined from an average of thicknesses of the resin supply material 1 at randomly selected ten points within an area of 50 mm (length)×50 mm (width). The thickness direction is a direction orthogonal to a contact surface with the base material 2 to be used in the preform.

$$Q=Vpt/Vpi$$

Vpi: volume content of continuous porous material before molding

Vpt: volume content of continuous porous material after molding

In the resin supply material 1, it may also be preferred that both the change ratio P and the change ratio Q fall within the above-mentioned preferred ranges, respectively.

The method of preparing the resin supply material 1 is not particularly limited, and examples thereof may include a method in which a continuous porous material is immersed in a liquid resin to be impregnated with the resin; a method in which a continuous porous material and a resin are pressurized using a press flat plate or a roll under a heating condition to reduce the viscosity of the resin so that the continuous porous material is impregnated with the resin; and a method in which a continuous porous material and a resin are enclosed under a reduced-pressure condition so that air existing in the continuous porous material is replaced by the resin to impregnate the continuous porous material with the resin.

The resin supply material 1 is preferably in the form of a sheet, and the thickness of the sheet is preferably 0.5 mm or more, more preferably 1 mm or more, still more preferably 1.5 mm or more from the viewpoint of a handling characteristic, a resin supply characteristic and dynamic characteristics. From the viewpoint of a degree of design freedom and moldability, the thickness of the sheet is preferably 100 mm or less, more preferably 60 mm or less, still more preferably 30 mm or less.

A mass content Wpi of the continuous porous material in the resin supply material 1 is preferably 0.5% or more, more preferably 1.0% or more, still more preferably 1.5% or more. When the mass content Wpi is less than 0.5%, the amount of the resin is excessively large with respect to the continuous porous material, the continuous porous material cannot hold the resin, or a large amount of the resin flows to the outside during molding. The mass content Wpi is not particularly limited, but it is preferably 30% or less, more preferably 22% or less, still more preferably 15% or less. When the mass content Wpi is more than 30%, the fiber-reinforced resin may have a large number of voids due to poor impregnation of the resin into the base material 2. The mass content Wpi is determined in accordance with JIS K7075 (1991) "Fiber Content and Void Content Test Methods for Carbon Fiber-Reinforced Plastic".

A volume content Vpi of the continuous porous material in the resin supply material 1 is preferably 0.3% or more, more preferably 0.6% or more, still more preferably 1.0% or more. When the volume content Vpi is less than 0.3%, the amount of the resin is excessively large with respect to the continuous porous material, the continuous porous material cannot hold the resin, or a large amount of the resin flows to the outside during molding. The volume content Vpi is not particularly limited, but it is preferably 20% or less, more preferably 15% or less, still more preferably 10% or less. When the volume content Vpi is more than 20%, the fiber-reinforced resin may have a large number of voids due to poor impregnation of the resin into the base material 2. The volume content Vpi is determined in accordance with JIS K7075 (1991) "Fiber Content and Void Content Test Methods for Carbon Fiber-Reinforced Plastic".

Base Material

The base material 2 included in the preform 3 is a fiber base material composed of reinforcing fibers, and is preferably at least one selected from a fabric base material, a unidirectional base material and a mat base material each composed of reinforcing fibers. Specifically, a single fabric foundation cloth composed of continuous fibers or a laminate of such fabric foundation cloths, a product obtained by stitching and integrating the fabric foundation cloths by a stitch thread, a fiber structure such as a three-dimensional fabric or a braided product, a non-woven fabric formed of discontinuous fibers, or the like is preferably used. The continuous fiber means a reinforcing fiber in which a reinforcing fiber bundle is drawn and aligned in a continuous state without cutting the reinforcing fiber into short fibers. The form and the arrangement of reinforcing fibers to be used in the base material 2 can be appropriately selected from continuous fiber forms such as a unidirectionally drawn and aligned long fiber, a fabric, a tow and a roving. The number of filaments in one fiber bundle to be used in the base material 2 is preferably 500 or more, more preferably 1500 or more, still more preferably 2500 or more. The number of filaments in one fiber bundle is preferably 150000 or less, more preferably 100000 or less, still more preferably 70000 or less.

To obtain a fiber-reinforced resin having high dynamic characteristics, it is preferred that a fabric base material or unidirectional base material composed of continuous reinforcing fibers is used as the base material 2, and to increase the resin impregnation rate to improve productivity of the fiber-reinforced resin and obtaining an isotropic fiber-reinforced resin, it is preferred that a mat base material composed of discontinuous fibers is used as the base material 2.

The base material 2 may be a single base material, or one obtained by laminating a plurality of base materials, or may be one obtained by partially laminating base materials or laminating different base materials according to characteristics required for the preform 3 or the fiber-reinforced resin.

Preform

Preferably, the preform 3 includes the resin supply material 1 and the base material 2. The preform 3 is a laminate obtained by laminating and integrating the resin supply material 1 and the base material 2. Preferably, the resin supply material 1 and the base material 2 are adjacent in the thickness direction from the viewpoint of supply of the resin from the resin supply material 1 to the base material 2. Examples of the preform 3 include a sandwich laminate in which the resin supply material 1 is sandwiched between base materials 2 or the base material 2 is sandwiched between resin supply materials 1; an alternating laminate in which resin supply materials 1 and base materials 2 are alternately laminated; and a combination thereof. Formation of the preform 3 beforehand is preferred because the base material 2 can be quickly and more uniformly impregnated with a resin in a process for producing a fiber-reinforced resin.

Method of Producing Fiber-Reinforced Resin

Examples of the method of producing a fiber-reinforced resin by heating and pressurizing the preform 3 to supply a resin from the resin supply material 1 to the base material 2 so that a fiber-reinforced resin is molded include the following method. The preform 3 including the resin supply material 1 and the base material 2 is prepared, and set on a metal mold. The resin is made flowable by heat from the metal mold (in a thermosetting resin, the resin has a reduced viscosity until curing of the resin; and in a thermoplastic resin, the resin is melted or softened), and the preform 3 is pressurized to supply the resin to the base material 2. The pressurization method is preferably press molding or vacuum-pressure molding. For the molding temperature here, the temperature during supply of the resin and the temperature during curing may be the same, or different when the resin is a thermosetting resin. When the resin is a thermoplastic resin, the temperature during supply of the resin is preferably higher than the melting point of the resin by 10° C. or more. The temperature at which the resin is solidified after supply of the resin is preferably lower than the melting point of the resin by 10° C. or more, more preferably by 30° C. or more, still more preferably 50° C. or more. The metal mold to be used for molding may be a double-sided mold composed of a rigid body, or a single-sided mold. In the latter, the preform 3 is disposed between a flexible film and the single-sided metal mold, and the pressure a space between the flexible film and the single-sided metal mold is made lower than the pressure in the outside environment to bring the preform 3 into a pressurized state). When the resin is a thermosetting resin, heating to a temperature at which the thermosetting resin is cured is performed after molding as necessary in addition to heating during molding so that the thermosetting resin is cured to obtain a fiber-reinforced resin. When the resin is a thermoplastic resin, the resin melted by heating during molding is cooled to solidify the resin so that a fiber-reinforced resin is obtained.

EXAMPLES

Hereinafter, our resin supply materials, preforms and methods will be described further in detail by way of examples. First, evaluation methods will be described below.

Evaluation Method 1 Mass Per Unit Area mrt of Continuous Porous Material

A test piece with a length of 100 mm and a width of 100 mm was cut out from a continuous porous material, and the mass of the test piece was measured, and defined as a mass mrtn (n=1 to 6) of the continuous porous material. A value calculated from an average of the masses mrtn in accordance with the following formula was defined as a mass per unit area mrt of the continuous porous material.

$mrt = \text{average of } mrtn \times 100$

Evaluation Method 2 Bending Length Crt of Continuous Porous Material at 23° C.

Figure 4I:
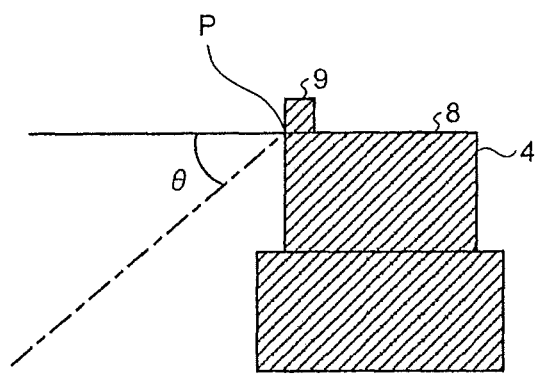
FIG. 4 (i) and (ii) are schematic sectional views showing a cantilever-type tester that evaluates the bending resistance, and a schematic view showing a state in which the bending resistance of a continuous porous material is evaluated.
Figure 4:
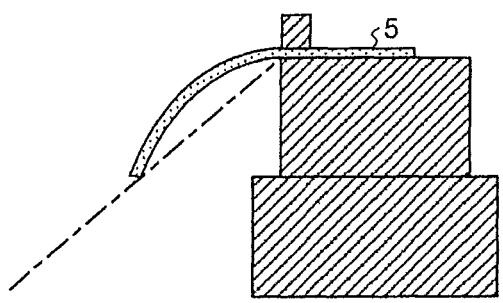

In reference to a method for measurement of a bending resistance as specified in JIS-L1913 (2010) "Method for Testing General Non-Woven Fabrics", a cantilever-type tester 8 shown in FIG. 4(i) is provided, a test piece with a width of 25 mm and a length of 500 mm is cut out from a continuous porous material, the operation of pushing the test piece frontward by 10 mm and leaving the test piece to stand for 10 seconds while pressing a front end P of a platform with a plumb 9 having a weight of 250 g is repeated, and a protruding length in which the test piece extends over a line drawn downward by 41.5° from the front end P of the platform is read (FIG. 4(ii). A length that is half the read protruding length was defined as a bending length Crtn (n=1 to 6), and an average of the bending lengths Crtn was defined as a bending length Crt of the continuous porous material.

Evaluation Method 3 Bending Resistance Grt of Continuous Porous Material at 23° C.

A value calculated in accordance with the following formula from the bending length Crt obtained in Evaluation Method 2 was defined as a bending resistance Grt.

$Grt = mrt \cdot Crt^3 \times 10^{-3}$

Grt: bending resistance (mN·cm) of continuous porous material at 23° C.

mrt: mass per unit area (g/m²) of continuous porous material at 23° C.

Crt: bending length (cm) of continuous porous material at 23° C.

Evaluation Method 4 Bending Length Cmt of Continuous Porous Material at 70° C.

The evaluation apparatus used in Evaluation Method 2 was placed in a dryer with the inside temperature adjusted to 70° C., and evaluation was similarly performed. Since the inside temperature decreases at the time of opening/closing a door of the dryer to handle the test piece, a time taken until the inside temperature returns to 70° C. after opening/closing of the door is measured beforehand, and after the measured time plus 10 seconds, a positional relation between the test piece and the line drawn downward by 41.5° from the front end of the platform. A length that is half the read protruding length was defined as a bending length Cmtn (n=1 to 6), and an average of the bending lengths Cmtn was defined as a bending length Cmt of the continuous porous material.

Evaluation Method 5 Bending Resistance Gmt of Continuous Porous Material at 70° C.

A value calculated in accordance with the following formula from the bending length Cmt obtained in Evaluation Method 4 was defined as a bending resistance Gmt.

$Gmt = mrt \cdot Cmt^3 \times 10^{-3}$

Gmt: bending resistance (mN·cm) of continuous porous material at 70° C.

mrt: mass per unit area (g/m²) of continuous porous material at 23° C.

Cmt: bending length (cm) of continuous porous material at 70° C.

Evaluation Method 6 Minimum Tensile Strength σmin of Continuous Porous Material

Test pieces with a width of 50 mm and a length of 280 mm were cut out from a continuous porous material in the directions of +45°, 90° and −45° with respect to a direction set to 0°. The obtained test pieces were used, and as a tester, "Instron" (registered trademark) Universal Tester (manufactured by Instron). The tensile strength is a value obtained by dividing a load at a rupture point by a cross-sectional area. An average of tensile strengths of the test pieces was designated as σθ (θ=0, 45, 90, −45). The minimum value here was defined as a minimum tensile strength σmin of the continuous porous material.

Evaluation Method 7 Elastic Modulus Ert of Resin (Thermosetting Resin) A storage elastic modulus G' of a resin at 23° C. in measurement performed at a frequency of 0.5 Hz and a Gap of 1 mm with the resin disposed on a φ40 mm parallel plate and heated monotonously at a temperature elevation rate of 1.5° C./min from an initial temperature of 10° C. using a dynamic viscoelasticity measurement apparatus (Rheometer RDA2: manufactured by Rheometric Scientific Ltd or Rheometer ARES: manufactured by TA Instruments) as a tester was defined as an elastic modulus Ert of the resin.

(Thermoplastic Resin) A resin was dried under the recommended conditions described in a product catalog (drying of the resin by a vacuum dryer is more preferred), and the resin was then molded into a dumbbell test piece of Type-I in accordance with ASTM D638 using an injection molding machine (manufactured by JSW, Ltd., J150EII-P). The obtained dumbbell test piece was used, and as a tester, "Instron" (registered trademark) Universal Tester (manufactured by Instron). The value obtained here was defined as an elastic modulus Ert of the resin.

Evaluation Method 8 Tensile Strength Ratio σr of Continuous Porous Material

The tensile strength ratio σr is calculated from the following formula using the minimum tensile strength σmin obtained in Evaluation Method 6 and a tensile strength σm in a direction orthogonal to a direction in which the continuous porous material has the minimum tensile strength (the orthogonal direction is 90° when the direction in which the continuous porous material has the minimum tensile strength σmin is 0°).

$$\sigma r = \sigma o / \sigma min$$

Evaluation Method 9 Thickness of Continuous Porous Material and Resin Supply Material The thickness of each of the continuous porous material and a resin supply material was measured in accordance with a method for measurement of a thickness as specified in JIS-L1913 (2010) "Method for Testing General Non-Woven Fabrics".

Evaluation Method 10 Handling Characteristic of Continuous Porous Material, Resin Supply Material and Preform An evaluation was performed on whether or not wrinkles were generated in a material, operations were carried out over again, or the material was broken when the material was held with a hand at a position of 2 cm from an end thereof, or laminated at the time of providing each material. A sample was rated ○ when it was able to successfully carry out operations, a sample was rated Δ when wrinkles were generated or operations were carried out over again, and a sample was rated x when the material was broken.

Evaluation Method 11 Resin-Impregnated State of Base Material

The obtained fiber-reinforced resin was cut, and a cross-section was observed in the thickness direction with a microscope to examine a resin-impregnated state and presence/absence of voids. Presence/absence of voids in the base material was determined by presence/absence of voids with a diameter of 5 μm or more in a microscopic observation image. A sample was rated ○ when impregnation was sufficiently performed, and there existed no voids, and a sample was rated x when impregnation was insufficient, and/or there existed voids.

Evaluation Method 12 Dynamic Characteristics of Fiber-Reinforced Resin

In accordance with JIS-K7074 (1988) "Bending Test Method for Carbon Fiber-Reinforced Plastics", a test piece was cut out from the obtained fiber-reinforced resin, and a bending elastic modulus was determined.

Materials Used

A material having a length of 300 mm and a width of 450 mm is required in the state of a resin supply material. Therefore, the continuous porous material and the resin were cut to a slightly larger size of 350 mm (length)×500 mm (width).

Continuous Porous Material (a-1)

A polyester-based urethane foam "MOLTOPREN (registered trademark)" ER-1 manufactured by Inoac Corporation was provided as a continuous porous material (a-1). The characteristics of the continuous porous material (a-1) are as shown in Table 1.

Continuous Porous Materials (a-2) and (a-3)

Continuous porous materials (a-2) and (a-3) composed of reinforcing fibers were provided in the following steps.

(1) From a copolymer mainly composed of PAN, continuous fibers (c-1) including total 12,000 monofilaments were prepared by performing spinning, a firing treatment and a surface oxidation treatment. The continuous fibers (c-1) had characteristics as shown below.

Monofilament diameter: 7 μm
Mass per unit length: 0.8 g/m
Density: 1.8 g/cm$^3$
Tensile strength: 4600 MPa
Tensile elastic modulus: 220 GPa (2) The continuous fibers (c-1) obtained in (1) were cut to a length of 6 mm by a cartridge cutter to prepare chopped fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped fibers. The production apparatus includes a cylindrical container as a dispersion tank which includes an opening cock in the lower part of the container and which has a diameter of 1000 mm; and a linear transportation section (inclination angle: 30 degrees) that connects the dispersion tank and a papermaking tank. A stirrer is attached to an opening section on the upper surface of the dispersion tank, and the chopped fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a fiber base material (papermaking base material) connects to the mesh conveyor. In papermaking, the fiber concentration in the dispersion liquid was adjusted to adjust the mass per unit area. About 5% by mass of a polyvinyl alcohol aqueous solution (KURARAY POVAL, manufactured by KURARAY CO., LTD.) as a binder was deposited on the fiber base material subjected to papermaking, and was dried in a drying furnace at 140° C. for 1 hour to prepare desired continuous porous materials (a-2) and (a-3). The continuous porous materials (a-2) and (a-3) had a mean fiber length of 5.8 mm. The characteristics of the continuous porous materials (a-2) and (a-3) are as shown in Table 1.

Continuous Porous Material (a-4)

A continuous porous material (a-4) composed of reinforcing fibers was provided in the following steps.

The continuous fibers (c-1) were cut to a length of 25 mm by a cartridge cutter to prepare chopped fibers. The obtained chopped fibers were introduced into a cotton opener to prepare a fiber assembly. Using a carding apparatus having a cylinder roll with a diameter of 600 mm (rotation number of cylinder roll: 320 rpm; doffer speed: 13 m/min), continuous porous material (a-4) composed of discontinuous fibers were prepared with the fiber direction intentionally made coincident with the take-up direction in the carding apparatus. The characteristics of the continuous porous material (a-4) are as shown in Table 1.

Continuous Porous Material (a-5)

"ACHILLES BOARD (registered trademark)" manufactured by Achilles Corporation was provided as a continuous porous material (a-5). To adjust the thickness, the continuous porous material was processed to a thickness of 1.5 mm by a slicer. The characteristics of the continuous porous material (a-5) are as shown in Table 1.

Resin (b-1)

A resin was prepared using 40 parts by mass of "jER (registered trademark)" 1007 (manufactured by Mitsubishi Chemical Corporation), 20 parts by mass of "jER (registered trademark)" 630 (manufactured by Mitsubishi Chemical Corporation), 40 parts by mass of "EPICLON (registered trademark)" 830 (manufactured by DIC Corporation), DICY7 (manufactured by Mitsubishi Chemical Corporation) as a curing agent in an amount of 0.9 equivalents in terms of active hydrogen groups based on the amount of epoxy groups in all the epoxy resin components, and 2 parts by mass of DCMU99 (manufactured by HODOGAYA CHEMICAL CO., LTD.) as a curing accelerator. Using a reverse roll coater, the prepared resin was applied onto a release paper to prepare resin films with masses per unit area of 50 g/m$^2$ and 100 g/m$^2$, respectively. Any of these resin films was laminated according to a purpose so that the mass per unit area of the resin was changed. The characteristics of the resin (b-1) are as shown in Table 2.

Resin (b-2)

A film-shaped resin (b-2) with a weight per unit area of 100 g/m$^2$ was prepared using a master batch including 90% by mass of an unmodified polypropylene resin ("Prime Polypro (registered trademark)" J707G manufactured by Prime Polymer Co., Ltd.) and 10% by mass of an acid-modified polypropylene resin ("ADMER" (registered trademark) QB510). The characteristics of the resin (b-2) are as shown in Table 2.

Resin Supply Material (A-1)

A resin supply material (A-1) was prepared by laminating the continuous porous material (a-1) and 750 g/m$^2$ of the resin (b-1) to obtain a laminate of resin (b-1)/continuous porous material (a-1)/resin (b-1), and heating the laminate under a pressurizing condition at a surface pressure of 0.1 MPa for 1.5 hours in a press machine with the temperature adjusted to 70° C. In the resin supply material (A-1), the volume content Vpi of the continuous porous material (a-1) was 9.7%, and the mass content Wpi of the continuous porous material (a-1) was 10.4%. Other characteristics are as shown in Table 3.

Resin Supply Material (A-2)

Except that the continuous porous material (a-2) was used, the same procedure as in the case of the resin supply material (A-1) was carried out to prepare a resin supply material (A-2). In the resin supply material (A-2), the volume content Vpi of the continuous porous material (a-2) was 4.3%, and the mass content Wpi of the continuous porous material (a-2) was 6.3%. Other characteristics are as shown in Table 3.

Resin Supply Material (A-3)

Except that the continuous porous material (a-3) was used, the same procedure as in the resin supply material (A-1) was carried out to prepare a resin supply material (A-3). In the resin supply material (A-3), the volume content Vpi of the continuous porous material (a-3) was 11.9%, and the mass content Wpi of the continuous porous material (a-3) was 16.7%. Other characteristics are as shown in Table 3.

Resin Supply Material (A-4)

A resin supply material (A-4) was prepared by laminating the continuous porous material (a-2) and 750 g/m$^2$ of the resin (b-2) to obtain a laminate of resin (b-2)/continuous porous material (a-2)/resin (b-2), heating the laminate under a pressurizing condition at a surface pressure of 0.1 MPa for 10 minutes in a press machine with the temperature adjusted to 180° C., and cooling the laminate under the pressurizing condition until the temperature of the press machine reached 100° C. In the resin supply material (A-4), the volume content Vpi of the continuous porous material (a-2) was 3.3%, and the mass content Wpi of the continuous porous material (a-2) was 6.3%. Other characteristics are as shown in Table 3.

Resin Supply Material (A-5)

Except that the continuous porous material (a-4) was used, the same procedure as in the case of the resin supply material (A-1) was carried out to prepare a resin supply material (A-5). In the resin supply material (A-5), the volume content Vpi of the continuous porous material (a-4) was 5.8%, and the mass content Wpi of the continuous porous material (a-4) was 6.3%. Other characteristics are as shown in Table 3.

Resin Supply Material (A-6)

Except that the continuous porous material (a-5) was used, the same procedure as the resin supply material (A-1) was carried out to prepare a resin supply material (A-6). In the resin supply material (A-6), the volume content Vpi of the continuous porous material (a-5) was 13.6%, and the mass content Wpi of the continuous porous material (a-5) was 14.5%. Other characteristics are as shown in Table 3.

Base Material (B-1)

"TORAYCA" Cloth CO6343B (plain fabric, weight per unit area of carbon fibers: 198 g/m$^2$) manufactured by Toray Industries, Inc. was provided as a base material (B-1).

Example 1

A preform (D-1) was prepared by laminating the resin supply material (A-1) with a length of 300 mm and a width of 450 mm and the base material (B-1) to obtain a laminate of base material (B-1)/base material (B-1)/resin supply material (A-1)/base material (B-1)/base material (B-1). A fiber-reinforced resin (E-1) was prepared by molding the preform (D-1) by a molding method including the following steps.

(1) The preform (D-1) is preheated at a surface pressure of 0 at 70° C. for 10 minutes using a press machine.

(2) The preform (D-1) is pressurized at a surface pressure of 1 MPa.

(3) The preform (D-1) is heated at a rate of 3° C./minute to 150° C., and then held for 40 minutes to cure the resin.

The characteristics of the obtained fiber-reinforced resin (E-1) are as shown in Table 4.

Example 2

Except that the resin supply material (A-2) was used, the same procedure as in Example 1 was carried out to prepare a preform (D-2) and a fiber-reinforced resin (E-2). The characteristics of the obtained fiber-reinforced resin (E-2) are as shown in Table 4.

Example 3

Except that the resin supply material (A-3) was used, the same procedure as in Example 1 was carried out to prepare a preform (D-3) and a fiber-reinforced resin (E-3). The characteristics of the obtained fiber-reinforced resin (E-3) are as shown in Table 4.

Example 4

A preform (D-4) was prepared by laminating two resin supply materials (A-2), which are the same as in Example 2, and four base materials (B-1) to obtain a laminate of resin supply material (A-2)/base material (B-1)/base material (B-1)/base material (B-1)/base material (B-1)/resin supply material (A-2). Except that the preform (D-4) was used, the same procedure as in Example 1 was carried out to prepare a fiber-reinforced resin (E-4). The characteristics of the obtained fiber-reinforced resin (E-4) are as shown in Table 4.

Example 5

A preform (D-5) was prepared by laminating the resin supply material (A-4) and the base material (B-1) to obtain a laminate of base material (B-1)/base material (B-1)/resin supply material (A-4)/base material (B-1)/base material (B-1). A fiber-reinforced resin (E-5) was prepared by molding the preform (D-5) by a molding method including the following steps.

(1) The preform (D-5) is preheated at a surface pressure of 0 at 180° C. for 5 minutes using a press machine.

(2) The preform (D-5) is pressurized at a surface pressure of 1 MPa for 5 minutes.

(3) The resin is solidified by cooling the preform (D-5) to 100° C. while maintaining the pressurizing condition in (2).

The characteristics of the obtained fiber-reinforced resin (E-5) are as shown in Table 4.

Example 6

The preform (D-2) used in Example 2 was disposed on a metal plate, and covered with a film, the metal plate and the film were sealed to each other with a sealing material, and a space covered by the film was brought into a vacuum state ($10^{-1}$ Pa) using a vacuum pump. The preform was put in a dryer with the inside temperature adjusted to 70° C. while the preform was kept in this state, and preheating was performed for 10 minutes. After the preheating, the preform was heated at a rate of 3° C./min to 150° C., and then held for 40 minutes to cure the resin, thereby preparing a fiber-reinforced resin (E-6). The characteristics of the obtained fiber-reinforced resin (E-6) are as shown in Table 4.

In Examples 1 to 4, the continuous porous material, the resin supply material and the preform were easily prepared. In Example 5, a material having a higher handling characteristic and higher workability was obtained by using as a resin a thermoplastic resin that is in a solidified state at 23° C. In Example 6, the material was confirmed to be not only excellent in handling characteristic at 23° C., but also suitable for a molding method capable of molding even a complicated shape at a low pressure as in vacuum-pressure molding. By using such a material, a fiber-reinforced resin was easily produced without use of additional subsidiary materials.

Comparative Example 1

Except that only the resin (b-1) was used in place of the resin supply material, the same procedure as in Example 1 was carried out. Since only the resin (b-1) was used (i.e. the continuous porous material was not used), it took much time for lamination work due to, for example, occurrence of breakage in a resin film in conveyance of the film for lamination, and many wrinkles were generated in the film. The obtained fiber-reinforced resin had non-impregnated portions because a large amount of the resin (b-1) flowed out in the surface direction rather than being impregnated into the base material (B-1), and thus it was unable to obtain a desired fiber-reinforced resin.

Comparative Example 2

Except that the resin supply material (A-5) was used, the same procedure as in Example 1 was carried out. The continuous porous material (a-4) was broken during preparation of the resin supply material (A-5), and thus it was difficult to prepare the homogeneous resin supply material (A-5). Careful handling was required in lamination, and thus it took much time for lamination work although not so much time as in Comparative Example 1. A pressure during molding caused the continuous porous material (a-4) to flow out in the surface direction so that the resin was not sufficiently supplied to the base material (B-1), and thus it was unable to obtain a desired fiber-reinforced resin.

Comparative Example 3

Except that the resin supply material (A-6) was used, the same procedure as in Example 1 was carried out. The resin was not impregnated into the central part of the continuous porous material (a-5) during preparation of the resin supply material (A-6), and thus the resin supply material (A-6) had had a large amount of resin on both surfaces. This may be because the continuous porous material was a closed-cell foam having isolated cells, and the continuous porous material changed in thickness under pressure like a sponge so that it was unable to absorb (hold) the resin. Further, the continuous porous material (a-5) was collapsed under pressure during molding, and thus the obtained fiber-reinforced resin was in the form of two fiber-reinforced resins separated at the inside of the continuous porous material (a-5).

TABLE 1

| | Continuous porous material | | a-1 | a-2 | a-3 | a-4 | a-5 |
|---|---|---|---|---|---|---|---|
| 23° C. | Bending length: Crt | cm | 6.0 | 8.0 | 7.0 | 2.0 | 20.0 |
| | Weight per unit area: M | g/m² | 175 | 100 | 300 | 100 | 255 |
| | Bending resistance: Grt | mN · cm | 37.8 | 51.2 | 103.0 | 0.8 | 2040.0 |
| | Tensile strength ratio: σr | — | 1.05 | 1.02 | 1.02 | 1.30 | 1.10 |
| | Minimum tensile strength | MPa | 0.11 | 16.00 | 16.00 | 0.20 | 0.30 |
| | Thickness | mm | 5.0 | 3.0 | 8.8 | 5.0 | 1.5 |
| 70° C. | Bending length: Cmt | cm | 4.0 | 4.0 | 3.5 | 1.5 | 19.0 |
| | Bending resistance: Gmt | mN · cm | 11.2 | 6.4 | 12.9 | 0.3 | 1749.0 |
| | Gr(=Gmt/Grt) | — | 0.30 | 0.13 | 0.13 | 0.38 | 0.86 |
| Constituent material | | — | Urethane | CF | CF | CF | Urethane |

TABLE 2

| | Resin | | b-1 | b-2 |
|---|---|---|---|---|
| 23° C. | Elastic modulus: Ert | MPa | 1.1 | 1.4 |
| | Kind of resin | — | Epoxy | PP |

TABLE 3

| Resin supply material | | A-1 | A-2 | A-3 | A-4 | A-5 | A-6 |
|---|---|---|---|---|---|---|---|
| Structure | Continuous porous material | — | a-1 | a-2 | a-3 | a-2 | a-4 | a-5 |
| | Resin | — | b-1 | b-1 | b-1 | b-2 | b-1 | b-1 |
| Thickness: T | mm | 5.0 | 2.0 | 3.9 | 6.0 | 3.0 | 1.5 |
| Volume content of continuous porous material: Vpi | % | 9.7 | 4.3 | 11.9 | 3.3 | 5.8 | 13.6 |
| Mass content of continuou sporous material: Wpi | % | 10.4 | 6.3 | 16.7 | 6.3 | 6.3 | 14.5 |

TABLE 4

| | | Example 1 | Example 2 | Example 3 | Example 4 | Example 5 | Example 6 |
|---|---|---|---|---|---|---|---|
| Preform | Structure | — | (B-1) | (B-1) | (B-1) | (A-2) | (B-1) | (B-1) |
| | | — | (B-1) | (B-1) | (B-1) | (B-1) | (B-1) | (B-1) |
| | | — | (A-1) | (A-2) | (A-3) | (B-1) | (A-4) | (A-2) |
| | | — | (B-1) | (B-1) | (B-1) | (B-1) | (B-1) | (B-1) |
| | | — | (B-1) | (B-1) | (B-1) | (B-1) | (B-1) | (B-1) |
| | | — | | | | (A-2) | | |
| Handling characteristic | | — | ○ | ○ | ○ | ○ | ○ | ○ |
| Fiber-reinforced resin | | | | | | | | |
| | Molding method | — | Press | Press | Press | Press | Press | Vacuum-pressure |
| | Resin change ratio: P | % | 0.23 | 0.28 | 0.66 | 0.28 | 0.25 | 0.37 |
| | Resin-impregnated state | — | ○ | ○ | ○ | ○ | ○ | ○ |
| | Bending elastic modulus | GPa | 20 | 34 | 26 | 28 | 29 | 33 |

TABLE 5

| | | Comparative Example 1 | Comparative Example 2 | Comparative Example 3 |
|---|---|---|---|---|
| Preform | Structure | — | (B-1) | (B-1) | (B-1) |
| | | — | (B-1) | (B-1) | (B-1) |
| | | — | (b-1) | (A-5) | (A-6) |
| | | — | (B-1) | (B-1) | (B-1) |
| | | — | (B-1) | (B-1) | (B-1) |
| | | — | | | |
| Handling characteristic | | — | Δ | x | ○ |
| Fiber-reinforced resin | | | | | |
| | Molding method | — | Press | Press | Press |
| | Resin change ratio: P | % | — | — | — |
| | Resin-impregnated state | — | x | x | x |
| | Bending elastic modulus | GPa | Measurement impossible | Measurement impossible | Measurement impossible |

Continuous Porous Material

To exhibit a handling characteristic in the resin supply material 1, the continuous porous material is required to have a tensile strength σrt of 0.5 MPa or more at 23° C., and a tensile strength ratio σr of 0.5 or more. The tensile strength ratio σr will be described below.

The "continuous porous material" refers to a porous material in which included pores are mutually connected, and the porous material is permeable to a gas such as air or a liquid such as water in the thickness direction or the porous material. Whether or not the porous material is permeable to a gas or a liquid can be determined in accordance with JIS-L1096 (2010) "Method for Testing Cloths of Woven and Knitted Fabrics" and JIS-R1671 (2006) "Method for Testing Water Permeability and Hydraulic Power Equivalent Diameter Test Method".

The tensile strength σrt of the continuous porous material at 23° C. is one of indices indicating dynamic characteristics of the continuous porous material in evaluation performed in accordance with a method for measurement of a tensile strength as specified in JIS-L1913 (2010) "Method for Testing General Non-Woven Fabrics". The "tensile strength ratio" is a ratio of a tensile strength σmt at 130° C. and a tensile strength σrt at 23° C., and can be expressed by the following formula.

$$\sigma r = \sigma mt / \sigma rt$$

The continuous porous material is required to have a tensile strength σrt of 0.5 MPa or more, and to prevent the continuous porous material 5 from being ruptured by a tensile force or self-weight (FIG. 3(*iii*)), for example, in Second Construction We also provide a resin supply material including a continuous porous material and a resin. As shown in FIG. 1, we also provide a preform 3 including such a resin supply material 1 and a base material 2, and a method of producing a fiber-reinforced resin using the preform 3. First, the constituent materials will be described.

conveyance of the continuous porous material 5 with its both ends held by a clamp 7 as shown in FIG. 3(i), the tensile strength σrt is more preferably 1 MPa or more, still more preferably 3 MPa or more. When such a material is used, it is possible to apply a high tensile force at the time of holding the continuous porous material, and in the preform 3 including the resin supply material 1, it is possible to dispose a large number of base materials 2 so that the degree of design freedom can be improved.

The tensile strength σmt at 130° C. represents a dynamic characteristic of the continuous porous material during molding of the preform 3 including the resin supply material 1 and the base material 2, and the tensile strength ratio σr (=σmt/σrt) is required to be 0.5 or more. Use of the resin supply material 1 including a continuous porous material and a resin as described above makes it possible to provide the resin supply material 1 having all characteristics required in exhibition of a high handling characteristic during conveyance and lamination and preparation of a fiber-reinforced resin having high dynamic characteristics by molding.

A tensile strength ratio σrtr (=σrt/σrtmax) of the tensile strength σrt of the continuous porous material and the maximum tensile strength σrtmax is preferably within the range of 0.8 to 1. Such a continuous porous material eliminates the necessity to consider a direction of materials during lamination so that the degree of design freedom and productivity can be improved, and the resulting fiber-reinforced resin can exhibit isotropic dynamic characteristics. The tensile strength ratio σrtr is more preferably 0.9 to 1, still more preferably 0.95 to 1.

An elasticity ratio Eb of the continuous porous body is preferably 0.8 to 1. The "elasticity ratio" refers to a restoration force in squashing the continuous porous material, and details thereof will be described later. To obtain a fiber-reinforced resin that exhibits high dynamic characteristics, the elasticity ratio is more preferably 0.9 to 1, still more preferably 0.95 to 1. It is preferred that the elasticity ratio is within the above-mentioned range because in a process of holding a resin in the continuous porous material, the continuous porous material absorbs the resin like a sponge in restoration from a squashed state to an original thickness, so that the resin flows into the inner part of the continuous porous material, and thus the continuous porous material can absorb a larger amount of the resin. When the elasticity ratio Eb is less than 0.8, it may be unable to obtain a fiber-reinforced resin that exhibits high dynamic characteristics because in application of a pressure in a process for holding a resin or a process for molding a fiber-reinforced resin using a preform, the continuous porous material is collapsed under pressure, and cannot maintain an original structure.

The continuous porous material is not particularly limited, but it is preferably a continuous porous material that is not melted or softened in processes for preparing the resin supply material 1, the preform 3 and the fiber-reinforced resin. By using such a continuous porous material, a fiber-reinforced resin having high dynamic characteristics can be obtained because the continuous porous material exists in the fiber-reinforced resin as a reinforcing material while retaining characteristics of the continuous porous material having high dynamic characteristics.

Preferably, the continuous porous material is formed of reinforcing fibers. The reinforcing fiber is not particularly limited, but the reinforcing fiber is preferably a fiber composed of a material having dynamic characteristics higher than those of a resin serving as a matrix resin. Specific examples may include resin fibers such as fibers of poly- phenylene sulfide, polyamide, polycarbonate and polyimide, glass fibers, carbon fibers, aramid fibers and metal fibers. The reinforcing fiber is more preferably at least one selected from a glass fiber, a carbon fiber, an aramid fiber and a metal fiber among the fibers listed above. Among these reinforcing fibers, carbon fibers are still more preferred. The kind of carbon fibers is not particularly limited, and for example, polyacrylonitrile (PAN)-based carbon fibers, pitch-based carbon fibers and rayon-based carbon fibers can be preferably used from the viewpoint of an effect of reducing the weight of the fiber-reinforced resin. One kind of the carbon fibers, or a combination of two or more kinds of the carbon fibers may be used. Among them, PAN-based carbon fibers are further preferred from the viewpoint of a balance between the strength and the elastic modulus of the resulting fiber-reinforced resin. The monofilament diameter of the reinforcing fibers is preferably 0.5 µm or more, more preferably 2 µm or more, still more preferably 4 µm or more. The monofilament diameter of the reinforcing fibers is preferably 20 µm or less, more preferably 15 µm or less, still more preferably 10 µm or less. The strand strength of the reinforcing fibers is preferably 3 GPa or more, more preferably 4 GPa or more, still more preferably 4.5 GPa or more. The strand elastic modulus of the reinforcing fibers is preferably 200 GPa or more, more preferably 220 GPa or more, still more preferably 240 GPa or more.

The reinforcing fiber may be a continuous fiber to be used in a unidirectional base material, a fabric base material or the like, but the reinforcing fiber is preferably a discontinuous fiber from the viewpoint of a resin supply characteristic. The reinforcing fiber is preferably in the form of a web in which fibers are dispersed in a bundle shape or a monofilament shape, and gaps to be impregnated with a resin exist between the fibers. The form and the shape of the web are not limited and, for example, reinforcing fibers may be mixed with organic fibers, an organic compound or an inorganic compound, reinforcing fibers may be sealed together by other component, or reinforcing fibers may be bonded to a resin component. As a preferred form for easily producing a web in which fibers are dispersed, mention may be made of, for example, a base material in the form of a non-woven fabric obtained by a dry method or a wet method and in which reinforcing fibers are sufficiently opened, and monofilaments are bonded together by a binder composed of an organic compound.

Preferably, fibers in the continuous porous material formed of reinforcing fibers that are preferably used are bonded together by a binder. Accordingly, the handling characteristic and productivity and workability are improved, and the network structure of the continuous porous material can be retained. The binder is not particularly limited, and examples of the binder that is preferably used include thermoplastic resins such as polyvinyl alcohol, ethylene-propylene copolymers, ethylene-vinyl acetate copolymers, polyvinyl chloride, polyvinylidene chloride, polyvinyl acetate, polycarbonate resins, styrene-based resins, polyamide-based resins, polyester-based resins, polyphenylene sulfide resins, modified polyphenylene ether resins, polyacetal resins, polyetherimide resins, polypropylene resins, polyethylene resins, fluororesins, thermoplastic acrylic resins, thermoplastic polyester resins, thermoplastic polyamideimide resins, acrylonitrile-butadiene copolymers, styrene-butadiene copolymers and acrylonitrile-styrene-butadiene copolymers; and thermosetting resins such as urethane resins, melamine resins, urea resins, thermosetting acrylic resins, phenol resins, epoxy resins and thermosetting polyester. A resin having at least one functional group selected from an epoxy group, a hydroxy group, an acrylate group, a methacrylate group, an amide group, a carboxyl group, a carboxylic acid, an acid anhydride group, an amino group and an imine group is preferably used from the viewpoint of the dynamic characteristics of the resulting fiber-reinforced resin. These binders may be used alone, or in combination of two or more thereof. The attaching amount of the binder is preferably 0.01% or more, more preferably 0.1% or more, still more preferably 1% or more. The attaching amount of the binder is preferably 20% or less, more preferably 15% or less, still more preferably 10% or less. When the attaching amount of the binder is more than 20%, much time may be required in a drying process, or resin impregnability may be deteriorated. When the attaching amount of the binder is less than 0.01%, it may be difficult to maintain the form of a web composed of reinforcing fibers, leading to deterioration of the handling characteristic when the web is used in the continuous porous material. The attaching amount of the binder can be measured from a mass difference before and after application of the binder or by a burning method.

The mean fiber length of the reinforcing fibers is preferably 0.1 mm or more, more preferably 1 mm or more, still more preferably 2 mm or more. The mean fiber length of reinforcing fibers is not particularly limited, but it is preferably 100 mm or less, more preferably 50 mm or less, still more preferably 10 mm or less from the viewpoint of isotropy of the continuous porous material and dispersibility of the reinforcing fibers. Examples of the method of measuring the mean fiber diameter include a method in which reinforcing fibers are directly extracted from a reinforcing fiber base material; and a method in which a prepreg is dissolved using a solvent capable of dissolving only a resin of the prepreg, and the remaining reinforcing fibers are separated by filtration, and measured by microscopic observation (dissolution method). When a solvent capable of dissolving a resin is not available, mention is made of, for example, a method in which only the resin is burned off in a temperature range over which the oxidative weight loss of reinforcing fibers does not occur, and the reinforcing fibers are separated, and measured by microscopic observation (burning method). The measurement can be performed by randomly selecting 400 reinforcing fibers, determining the lengths of the reinforcing fibers to the order of 1 μm using an optical microscope, and determining fiber lengths and ratios thereof. In a comparison between the method in which reinforcing fibers are directly extracted from a reinforcing fiber base material and the method in which reinforcing fibers are extracted from a prepreg by a burning method or a dissolution method, there is no significant difference between the results obtained by the former method and the latter method as long as conditions are appropriately selected.

A mass per unit area (weight per unit area) of the continuous porous material in the present invention is preferably 10 g/m² or more, more preferably 100 g/m² or more, still more preferably 300 g/m² or more. When the mass per unit area is less than 1 g/m², the resin support characteristic may be deteriorated, thus making it unable to hold an amount of resin required for molding. Further, in the process of producing the resin supply material 1, the handling characteristic may be poor, leading to deterioration of workability.

Resin

The kind of resin is not particularly limited, and either a thermosetting resin or a thermoplastic resin can be used. As the thermosetting resin, at least one selected from an epoxy resin, a vinyl ester resin, a phenol resin, a thermosetting polyimide resin, a polyurethane resin, a urea resin, a melamine resin and a bismaleimide resin. In addition to a single epoxy resin, a copolymer of an epoxy resin and a thermosetting resin, a modified product, a resin obtained by blending two or more kinds of resins, and so on can be used. As the thermoplastic resin, at least one selected from polypropylene, polyethylene, polycarbonate, polyamide, polyester, polyarylene sulfide, polyphenylene sulfide, polyether ketone, polyether ether ketone, polyether ketone ketone, polyether sulfone, polyimide, polyamideimide, polyether imide and polysulfone is preferably used. A cyclic oligomer that is a precursor of any of these resins is also preferably used.

The elastic modulus of the resin at 23° C. is not particularly limited, but it is preferably 1 MPa or more, and it is more preferably 3 MPa or more, still more preferably 5 MPa or more for improving the handling characteristic, and the dynamic characteristics of the fiber-reinforced resin. For example, when the resin is a thermosetting resin, the elastic modulus of the resin can be evaluated using a storage elastic modulus G' at 23° C. in measurement performed at a frequency of 0.5 Hz and a Gap of 1 mm with the resin disposed on a φ40 mm parallel plate and heated monotonously at a temperature elevation rate of 1.5° C./min from an initial temperature of 10° C. using a dynamic viscoelasticity measurement apparatus as a tester. When the resin is a thermoplastic resin, the elastic modulus of the resin can be evaluated in the following manner: the resin is dried under the recommended conditions described in a product catalog (drying of the resin by a vacuum dryer is more preferred), and then molded into a dumbbell test piece of Type-I using an injection molding machine in accordance with ASTM D638, and the test piece is measured using "Instron" (registered trademark) Universal Tester (manufactured by Instron) as a tester.

The resin is preferably one that has a favorable handling characteristic at 23° C. and that is soft enough to easily impart a shape during shape impartment and during molding. Preferably, the resin has an elastic modulus lower than the elastic modulus at 23° C. due to heating during shape impartment and during molding.

The viscosity of the resin during impregnation (molding) is preferably 1000 Pa·s or less, more preferably 100 Pa·s or less, still more preferably 10 Pa·s or less. When the viscosity is more than 1000 Pa·s, the resulting fiber-reinforced resin may have non-impregnated portions and voids because the later-described base material 2 is not sufficiently impregnated with the resin.

Resin Supply Material

The resin supply material 1 is required to be excellent in handling characteristic and shape-imparting characteristic during conveyance and lamination in a state of the resin supply material 1 alone or the preform 3 including the base material 2, and the resin supply material 1 is also required to hold a resin serving as a matrix resin for the fiber-reinforced resin, and supply the resin to the base material 2 during molding. A resin mass change ratio P in the resin supply material 1 before and after molding as expressed by the following formula is preferably 0.03 or more, more preferably 0.05 or more, still more preferably 0.08 or more. To cause the resin to flow from the resin supply material 1 to the base material 2 so that a fiber-reinforced resin having a reduced number of voids is obtained, the change ratio P is preferably 0.99 or less, more preferably 0.7 or less, still more preferably 0.5 or less. A mass of resin Wr1 in the resin supply material 1 before molding and a mass of resin Wr2 in the resin supply material 1 after molding are determined in accordance with JIS K7075 (1991) "Fiber Content and Void Content Test Methods for Carbon Fiber-Reinforced Plastic". In the preform 3 including the resin supply material 1, the resin weights Wr1 and Wr2 can be determined in accordance with JIS K7075 (1991) (Fiber Content and Void Content Test Methods for Carbon Fiber-Reinforced Plastic) using only the resin supply material 1 taken out by polishing or cutting the preform.

$$P = Wr2/Wr1$$

Wr1: mass of resin (g) in resin supply material before molding

Wr2: mass of resin (g) in resin supply material after molding

By using this resin supply material 1, the resin can be supplied to a larger amount of the base material 2 so that the degree of design freedom and dynamic characteristics of the fiber-reinforced resin can be improved.

A volume content change ratio Q in continuous porous material in the resin supply material 1 before and after molding as expressed by the following formula is preferably 1.1 or more, more preferably 1.3 or more, still more preferably 1.5 or more for causing the resin to flow from the resin supply material 1 to the base material 2 so that a fiber-reinforced resin having a reduced number of voids is molded. To minimize outflow of the resin so that the resin efficiently flows from the resin supply material 1 to the base material 2, the change ratio Q is preferably 30 or less, more preferably 15 or less, still more preferably 5 or less. A volume content Vpt of the continuous porous material after molding is determined in accordance with JIS K7075 (1991) "Fiber Content and Void Content Test Methods for Carbon Fiber-Reinforced Plastic". In place of the above-mentioned method for determining the volume content Vpt, the volume content Vpt may be determined from the following formula using a thickness T (unit: mm, measured value), a weight per unit area Faw of the continuous porous material (unit: g/m$^2$, catalog value or measured value), and a density ρ of the continuous porous material (unit: g/cm$^3$, catalog value or measured value). The thickness T is determined from an average of thicknesses of the resin supply material 1 at randomly selected ten points within an area of 50 mm (length)×50 mm (width). The thickness direction is a direction orthogonal to a contact surface with the base material 2 to be used in the preform.

$$Q = Vpt/Vpi$$

Vpi: volume content (%) of continuous porous material before molding

Vpt: volume content (%) of continuous porous material after molding

In the resin supply material 1, it may also be preferred that both the change ratio P and the change ratio Q fall within the above-mentioned preferred ranges, respectively.

The method of preparing the resin supply material 1 is not particularly limited, and examples thereof may include a method in which a continuous porous material is immersed in a liquid resin to be impregnated with the resin; a method in which a continuous porous material and a resin are pressurized using a press flat plate or a roll under a heating condition for reducing the viscosity of the resin so that the continuous porous material is impregnated with the resin; and a method in which a continuous porous material and a resin are enclosed under a reduced-pressure condition so that air existing in the continuous porous material is replaced by the resin to impregnate the continuous porous material with the resin.

The resin supply material 1 is preferably in the form of a sheet, and the thickness of the sheet here is preferably 0.5 mm or more, more preferably 1 mm or more, still more preferably 1.5 mm or more from the viewpoint of a handling characteristic, a resin supply characteristic and dynamic characteristics. From the viewpoint of a degree of design freedom and moldability, the thickness of the sheet is preferably 100 mm or less, more preferably 60 mm or less, still more preferably 30 mm or less.

A mass content Wpi of the continuous porous material in the resin supply material 1 is preferably 0.5% or more, more preferably 1.0% or more, still more preferably 1.5% or more. When the mass content Wpi is less than 0.5%, the amount of the resin is excessively large with respect to the continuous porous material, the continuous porous material cannot hold the resin, or a large amount of the resin flows to the outside during molding. The mass content Wpi is not particularly limited, but it is preferably 30% or less, more preferably 22% or less, still more preferably 15% or less. When the mass content Wpi is more than 30%, the fiber-reinforced resin may have a large number of voids due to poor impregnation of the resin into the base material 2. The mass content Wpi is determined in accordance with JIS K7075 (1991) "Fiber Content and Void Content Test Methods for Carbon Fiber-Reinforced Plastic".

A volume content Vpi of the continuous porous material in the resin supply material 1 is preferably 0.3% or more, more preferably 0.6% or more, still more preferably 1.0% or more. When the volume content Vpi is less than 0.5%, the amount of the resin is excessively large with respect to the continuous porous material, the continuous porous material cannot hold the resin, or a large amount of the resin flows to the outside during molding. The volume content Vpi is not particularly limited, but it is preferably 20% or less, more preferably 15% or less, still more preferably 10% or less. When the volume content Vpi is more than 20%, the fiber-reinforced resin may have a large number of voids due to poor impregnation of the resin into the base material 2. The volume content Vpi is determined in accordance with JIS K7075 (1991) "Fiber Content and Void Content Test Methods for Carbon Fiber-Reinforced Plastic".

Base Material

The base material 2 included in the preform 3 is a fiber base material composed of reinforcing fibers, and is preferably at least one selected from a fabric base material, a unidirectional base material and a mat base material each composed of reinforcing fibers. Specifically, a single fabric foundation cloth composed of continuous fibers or a laminate of such fabric foundation cloths, a product obtained by stitching and integrating the fabric foundation cloths by a stitch thread, a fiber structure such as a three-dimensional fabric or a braided product, a non-woven fabric formed of discontinuous fibers, or the like is preferably used. The continuous fiber means a reinforcing fiber in which a reinforcing fiber bundle is drawn and aligned in a continuous state without cutting the reinforcing fiber into short fibers. In the present invention, the form and the arrangement of reinforcing fibers to be used in the base material 2 can be appropriately selected from continuous fiber forms such as a unidirectionally drawn and aligned long fiber, a fabric, a tow and a roving. The number of filaments in one fiber bundle to be used in the base material 2 is preferably 500 or more, more preferably 1500 or more, still more preferably 2500 or more. The number of filaments in one fiber bundle is preferably 150000 or less, more preferably 100000 or less, still more preferably 70000 or less.

To obtain a fiber-reinforced resin having high dynamic characteristics, it is preferred that a fabric base material or unidirectional base material composed of continuous reinforcing fibers is used as the base material 2, and to increase the resin impregnation rate to improve productivity of the fiber-reinforced resin and obtaining an isotropic fiber-reinforced resin, it is preferred that a mat base material composed of discontinuous fibers is used as the base material 2.

The base material 2 may be a single base material, or one obtained by laminating a plurality of base materials, or may be one obtained by partially laminating base materials or laminating different base materials according to characteristics required for the preform 3 or the fiber-reinforced resin.

Preform

Preferably, the preform 3 includes the resin supply material 1 and the base material 2. The preform 3 is a laminate obtained by laminating and integrating the resin supply material 1 and the base material 2. Preferably, the resin supply material 1 and the base material 2 are adjacent in the thickness direction from the viewpoint of supply of the resin from the resin supply material 1 to the base material 2. Examples of the preform 3 include a sandwich laminate in which the resin supply material 1 is sandwiched between base materials 2 or the base material 2 is sandwiched between resin supply materials 1; an alternating laminate in which resin supply materials 1 and base materials 2 are alternately laminated; and a combination thereof. Formation of the preform beforehand is preferred because the base material 2 can be quickly and more uniformly impregnated with a resin in a process of producing a fiber-reinforced resin.

Method of Producing Fiber-Reinforced Resin

Examples of the method of producing a fiber-reinforced resin by heating and pressurizing the preform 3 to supply a resin from the resin supply material 1 to the base material 2, so that a fiber-reinforced resin is molded include the following method. A preform including the resin supply material 1 and the base material 2 is prepared, and set on a metal mold. The resin is made flowable by heat from the metal mold (in a thermosetting resin, the resin has a reduced viscosity until curing of the resin; and in the case of a thermoplastic resin, the resin is melted or softened), and the preform 3 is pressurized to supply the resin to the base material 2. The pressurization method is preferably press molding or vacuum-pressure molding. For the molding temperature, the temperature during supply of the resin and the temperature during curing may be the same, or different when the resin is a thermosetting resin. When the resin is a thermoplastic resin, the temperature during supply of the resin is preferably higher than the melting point of the resin by 10° C. or more. The temperature at which the resin is solidified after supply of the resin is preferably lower than the melting point of the resin by 10° C. or more, more preferably by 30° C. or more, still more preferably 50° C. or more. The metal mold to be used for molding may be a double-sided mold composed of a rigid body, or a single-sided mold. In the latter case, the preform 3 is disposed between a flexible film and the single-sided metal mold, and the pressure a space between the flexible film and the single-sided metal mold is made lower than the pressure in the outside environment to bring the preform 3 into a pressurized state). When the resin is a thermosetting resin, heating to a temperature at which the thermosetting resin is cured is performed after molding as necessary in addition to heating during molding so that the thermosetting resin is cured to obtain a fiber-reinforced resin. When the resin is a thermoplastic resin, the resin melted by heating during molding is cooled to solidify the resin, so that a fiber-reinforced resin is obtained.

The melting point or the softening point of the continuous porous material is preferably higher than the molding temperature, and when the molding temperature is lower than the melting point or the softening point of the continuous porous material, the continuous porous material can be made exist in the fiber-reinforced resin as a reinforcing material while retaining high dynamic characteristics of the continuous porous material and, therefore, a fiber-reinforced resin having high dynamic characteristics can be obtained. The melting point or the softening point of the continuous porous material is preferably higher than the molding temperature by 10° C. or more, more preferably by 30° C. or more, still more preferably 50° C. or more. The melting point of the resin is a value measured at a temperature elevation rate of 10° C./minute by DSC in accordance with JIS-K7121 (2012). The softening point is a value of a Vicat softening temperature measured in accordance with JIS-K7206 (1999).

EXAMPLES

Hereinafter, our resin supply materials, preforms and methods will be described further in detail by way of examples. First, evaluation methods will be described below.

Evaluation Method 1 Tensile Strength Ratio σrt and Maximum Tensile Strength σrtmax of Continuous Porous Material Test pieces with a width of 50 mm and a length of 280 mm were cut out from a continuous porous material in the directions of +45°, 90° and −45° with respect to a direction set to 0°, and the tensile strength was measured in accordance with a method for measurement of a tensile strength as specified in JIS-L1913 (2010) "Method for Testing General Non-Woven Fabrics". "Instron" (registered trademark) Universal Tester (manufactured by Instron) was used as a tester. The tensile strength is a value obtained by dividing a load at a rupture point by a cross-sectional area. An average of tensile strengths of the test pieces was designated as σθ (θ=0, 45, 90, −45). The minimum value here was defined as a tensile strength σrt of the continuous porous material. The maximum value here was defined as a maximum tensile strength σrtmax of the continuous porous material.

Evaluation Method 2 Tensile Strength σmt of Continuous Porous Material at 130° C.

In a chamber with the inside temperature adjusted to 130° C., the same tension evaluation as in Evaluation Method 1 was performed using a test piece in the same direction as in the case of the tensile strength σrt obtained in Evaluation Method 1. The tensile strength here was defined as a tensile strength σmt at 130° C.

Evaluation Method 3 Tensile Strength Ratio σr of Continuous Porous Material

The value calculated in accordance with the following formula from the tensile strength σrt obtained in Evaluation Method 1 and the tensile strength σmt at 130° C. which was obtained in Evaluation Method 2 was defined as a tensile strength ratio σr of the continuous porous material.

$$\sigma r = \sigma mt/\sigma rt$$

Evaluation Method 4 Tensile Strength Ratio σRtr of Continuous Porous Material at 23° C.

The value calculated in accordance with the following formula from the tensile strength σrt and the maximum tensile strength σrtmax obtained in Evaluation Method 1 was defined as a tensile strength ratio σrtr of the continuous porous material at 23° C.

$$\sigma rtr=\sigma rt/\sigma rtmax$$

Evaluation Method 5 Thickness of Continuous Porous Material and Resin Supply Material The thickness of each of the continuous porous material and a resin supply material was measured in accordance with a method for measurement of a thickness as specified in JIS-L1913 (2010) "Method for Testing General Non-Woven Fabrics".

Evaluation Method 6 Elasticity Ratio Eb of Continuous Porous Material

A test piece with a length of 50 mm and a width of 50 mm was cut out from a continuous porous material, and a mass tb of the test piece was measured by Evaluation Method 5. "Instron" (registered trademark) Universal Tester (manufactured by Instron) was used as a tester, and a cylindrical indenter of ϕ100 mm having a flat bottom surface was used as an indenter. First, the continuous porous material was pressurized and squashed to a thickness equal to 50% of the thickness tb, and kept in this state for 1 minute. A thickness ta 3 minutes after cancellation of pressurization was then measured in accordance with Evaluation Method 5. An elasticity ratio Eb of the continuous porous material was calculated in accordance with the following formula from the thicknesses tb and ta.

$$Eb=ta/tb$$

tb: thickness of continuous porous material
ta: thickness of continuous porous material after pressurization and squashing.

Evaluation Method 7 Handling Characteristic of Continuous Porous Material, Resin Supply Material and Preform An evaluation was performed on whether or not wrinkles were generated in a material, operations were carried out over again, or the material was broken when the material was held with a hand at a position of 2 cm from an end thereof, or laminated at the time of providing each material. A sample was rated ○ when it was able to successfully carry out operations, a sample was rated Δ when wrinkles were generated or operations were carried out over again, and a sample was rated x when the material was broken.

Evaluation Method 8 Resin-Impregnated State of Base Material

The obtained fiber-reinforced resin was cut, and a cross-section was observed in the thickness direction with a microscope to examine a resin-impregnated state and presence/absence of voids. Presence/absence of voids in the base material was determined by presence/absence of voids with a diameter of 5 μm or more in a microscopic observation image. A sample was rated ○ when impregnation was sufficiently performed, and there existed no voids, and a sample was rated x when impregnation was insufficient, and/or there existed voids.

Evaluation Method 9 Dynamic Characteristics of Fiber-Reinforced Resin

In accordance with JIS-K7074 (1988) "Bending Test Method for Carbon Fiber-Reinforced Plastics", a test piece was cut out from the obtained fiber-reinforced resin, and a bending elastic modulus was determined.

Materials Used

A material having a length of 300 mm and a width of 450 mm is required in the state of a resin supply material. Therefore, the continuous porous material and the resin were cut to a slightly larger size of 350 mm (length)×500 mm (width).

Continuous Porous Material (a-1)

A PPS resin non-woven fabric prepared by a melt-blowing method and composed of a PPS resin was provided as a continuous porous material (a-1).

Continuous Porous Materials (a-2) and (a-3)

Continuous porous materials (a-2) and (a-3) composed of reinforcing fibers were provided in the following steps.

(1) From a copolymer mainly composed of PAN, continuous fibers (c-1) including total 12,000 monofilaments were prepared by performing spinning, a firing treatment and a surface oxidation treatment. The continuous fibers (c-1) had characteristics as shown below.

Monofilament diameter: 7 μm
Mass per unit length: 0.8 g/m
Density: 1.8 g/cm³
Tensile strength: 4600 MPa
Tensile elastic modulus: 220 GPa (2) The continuous fibers (c-1) obtained in (1) were cut to a length of 6 mm by a cartridge cutter to prepare chopped fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped fibers. The production apparatus includes a cylindrical container as a dispersion tank which includes an opening cock in the lower part of the container and which has a diameter of 1000 mm; and a linear transportation section (inclination angle: 30 degrees) that connects the dispersion tank and a papermaking tank. A stirrer is attached to an opening section on the upper surface of the dispersion tank, and the chopped fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a fiber base material (papermaking base material) connects to the mesh conveyor. In papermaking, the fiber concentration in the dispersion liquid was adjusted to adjust the mass per unit area. About 5% by mass of a polyvinyl alcohol aqueous solution (KURARAY POVAL, manufactured by KURARAY CO., LTD.) as a binder was deposited on the fiber base material subjected to papermaking, and was dried in a drying furnace at 140° C. for 1 hour to prepare desired continuous porous materials (a-2) and (a-3). The continuous porous materials (a-2) and (a-3) had a mean fiber length of 5.8 mm. The characteristics of the continuous porous materials (a-2) and (a-3) are as shown in Table 6.

Continuous Porous Material (a-4)

A continuous porous material (a-4) composed of reinforcing fibers was provided in the following steps.

The continuous fibers (c-1) were cut to a length of 25 mm by a cartridge cutter to prepare chopped fibers. The obtained chopped fibers were introduced into a cotton opener to prepare a fiber assembly. Using a carding apparatus having a cylinder roll with a diameter of 600 mm (rotation number of cylinder roll: 320 rpm; doffer speed: 13 m/min), continuous porous material (a-4) composed of discontinuous fibers were prepared with the fiber direction intentionally made coincident with the take-up direction in the carding apparatus. The characteristics of the continuous porous material (a-4) are as shown in Table 6.

Continuous Porous Material (a-5)

"ACHILLES BOARD (registered trademark) manufactured by Achilles Corporation was provided as a continuous porous material (a-5). To adjust the thickness, the continuous porous material was processed to a thickness of 1.5 mm by a slicer. The characteristics of the continuous porous material (a-5) are as shown in Table 6.

Continuous Porous Material (a-6)

A polyester-based urethane foam "MOLTOPREN (registered trademark)" ER-1 manufactured by Inoac Corporation was provided as a continuous porous material (a-6). The characteristics of the continuous porous material (a-6) are as shown in Table 6.

Resin (b-1)

A resin was prepared using 40 parts by mass of "jER (registered trademark)" 1007 (manufactured by Mitsubishi Chemical Corporation), 20 parts by mass of "jER (registered trademark)" 630 (manufactured by Mitsubishi Chemical Corporation), 40 parts by mass of "EPICLON (registered trademark)" 830 (manufactured by DIC Corporation), DICY7 (manufactured by Mitsubishi Chemical Corporation) as a curing agent in an amount of 0.9 equivalents in terms of active hydrogen groups based on the amount of epoxy groups in all the epoxy resin components, and 2 parts by mass of DCMU99 (manufactured by HODOGAYA CHEMICAL CO., LTD.) as a curing accelerator. Using a reverse roll coater, the prepared resin was applied onto a release paper to prepare resin films with masses per unit area of 50 g/m² and 100 g/m², respectively. Any of these resin films was laminated according to a purpose so that the mass per unit area of the resin was changed. The characteristics of the resin (b-1) are as shown in Table 7.

Resin (b-2)

A film-shaped resin (b-2) with a weight per unit area of 100 g/m² was prepared using a master batch including 90% by mass of an unmodified polypropylene resin ("Prime Polypro (registered trademark)" J707G manufactured by Prime Polymer Co., Ltd.) and 10% by mass of an acid-modified polypropylene resin ("ADMER" (registered trademark) QB510). The characteristics of the resin are as shown in Table 7.

Resin Supply Material (A-1)

A resin supply material (A-1) was prepared by laminating the continuous porous material (a-1) and 750 g/m² of the resin (b-1) to obtain a laminate of resin (b-1)/continuous porous material (a-1)/resin (b-1), and heating the laminate under a pressurizing condition at a surface pressure of 0.1 MPa for 1.5 hours in a press machine with the temperature adjusted to 70° C. In the resin supply material (A-1), the volume content Vpi of the continuous porous material (a-1) was 6.6%, and the mass content Wpi of the continuous porous material (a-1) was 7.4%. Other characteristics are as shown in Table 8.

Resin Supply Material (A-2)

Except that the continuous porous material (a-2) was used, the same procedure as in the case of the resin supply material (A-1) was carried out to prepare a resin supply material (A-2). In the resin supply material (A-2), the volume content Vpi of the continuous porous material (a-2) was 4.3%, and the mass content Wpi of the continuous porous material (a-2) was 6.3%. Other characteristics are as shown in Table 8.

Resin Supply Material (A-3)

Except that the continuous porous material (a-3) was used, the same procedure as in the case of the resin supply material (A-1) was carried out to prepare a resin supply material (A-3). In the resin supply material (A-3), the volume content Vpi of the continuous porous material (a-3) was 11.9%, and the mass content Wpi of the continuous porous material (a-3) was 16.7%. Other characteristics are as shown in Table 8.

Resin Supply Material (A-4)

A resin supply material (A-4) was prepared by laminating the continuous porous material (a-2) and 750 g/m² of the resin (b-2) to obtain a laminate of resin (b-2)/continuous porous material (a-2)/resin (b-2), heating the laminate under a pressurizing condition at a surface pressure of 0.1 MPa for 10 minutes in a press machine with the temperature adjusted to 180° C., and cooling the laminate under the pressurizing condition until the temperature of the press machine reached 100° C. In the resin supply material (A-4), the volume content Vpi of the continuous porous material (a-2) was 3.3%, and the mass content Wpi of the continuous porous material (a-2) was 6.3%. Other characteristics are as shown in Table 8.

Resin Supply Material (A-5)

Except that the continuous porous material (a-4) was used, the same procedure as in the case of the resin supply material (A-1) was carried out to prepare a resin supply material (A-5). In the resin supply material (A-5), the volume content Vpi of the continuous porous material (a-4) was 5.8%, and the mass content Wpi of the continuous porous material (a-4) was 6.3%. Other characteristics are as shown in Table 8.

Resin Supply Material (A-6)

Except that the continuous porous material (a-5) was used, the same procedure as in the case of the resin supply material (A-1) was carried out to prepare a resin supply material (A-6). In the resin supply material (A-6), the volume content Vpi of the continuous porous material (a-5) was 13.6%, and the mass content Wpi of the continuous porous material (a-5) was 14.5%. Other characteristics are as shown in Table 8.

Resin Supply Material (A-7)

Except that the continuous porous material (a-6) was used, the same procedure as in the case of the resin supply material (A-1) was carried out to prepare a resin supply material (A-7). In the resin supply material (A-1), the volume content Vpi of the continuous porous material (a-6) was 9.7%, and the mass content Wpi of the continuous porous material (a-6) was 10.4%. Other characteristics are as shown in Table 8.

Base Material (B-1)

"TORAYCA" Cloth CO6343B (plain fabric, weight per unit area of carbon fibers: 198 g/m²) manufactured by Toray Industries, Inc. was provided as a base material (B-1).

Example 1

A preform (D-1) was prepared by laminating the resin supply material (A-1) with a length of 300 mm and a width of 450 mm and the base material (B-1) to obtain a laminate of base material (B-1)/base material (B-1)/resin supply material (A-1)/base material (B-1)/base material (B-1). A fiber-reinforced resin 1 was prepared by molding the preform (D-1) by a molding method including the following steps.

(1) The preform (D-1) is preheated at a surface pressure of 0 at 70° C. for 10 minutes using a press machine.

(2) The preform (D-1) is pressurized at a surface pressure of 1 MPa.

(3) The laminate is heated to 150° C. at a rate of 3° C./minute, and then held for 40 minutes to be cured.

The characteristics of the obtained fiber-reinforced resin (E-1) are as shown in Table 9.

Example 2

Except that the resin supply material (A-2) was used, the same procedure as in Example 1 was carried out to prepare a preform (D-2) and a fiber-reinforced resin (E-2). The characteristics of the obtained fiber-reinforced resin (E-2) are as shown in Table 9.

Example 3

Except that the resin supply material (A-3) was used, the same procedure as in Example 1 was carried out to prepare a preform (D-3) and a fiber-reinforced resin (E-3). The characteristics of the obtained fiber-reinforced resin (E-3) are as shown in Table 9.

Example 4

A preform (D-4) was prepared by laminating two resin supply materials (A-2), which are the same as in Example 3, and four base materials (B-1) to obtain a laminate of resin supply material (A-2)/base material (B-1)/base material (B-1)/base material (B-1)/base material (B-1)/resin supply material (A-2). Except that the preform (D-4) was used, the same procedure as in Example 1 was carried out to prepare a fiber-reinforced resin (E-4). The characteristics of the obtained fiber-reinforced resin (E-4) are as shown in Table 9.

Example 5

A preform (D-5) was prepared by laminating the resin supply material (A-4) and the base material (B-1) to obtain a laminate of base material (B-1)/base material (B-1)/resin supply material (A-4)/base material (B-1)/base material (B-1). A fiber-reinforced resin (E-5) was prepared by molding the preform (D-5) by a molding method including the following steps.

(1) The preform (D-5) is preheated at a surface pressure of 0 at 180° C. for 5 minutes using a press machine.

(2) The preform (D-5) is pressurized at a surface pressure of 1 MPa for 5 minutes.

(3) The resin is solidified by cooling the preform (D-5) to 100° C. while maintaining the pressurizing condition in (2).

The characteristics of the obtained fiber-reinforced resin (E-5) are as shown in Table 9.

Example 6

The preform (D-2) used in Example 2 was disposed on a metal plate, and covered with a film, the metal plate and the film were sealed to each other with a sealing material, and a space covered by the film was brought into a vacuum state ($10^{-1}$ Pa) using a vacuum pump. The preform was put in a dryer with the inside temperature adjusted to 70° C. while the preform was kept in this state, and preheating was performed for 10 minutes. After the preheating, the preform was heated at a rate of 3° C./min to 150° C., and then held for 40 minutes to cure the resin, thereby preparing a fiber-reinforced resin (E-6). The characteristics of the obtained fiber-reinforced resin (E-6) are as shown in Table 9.

In Examples 1 to 4, the continuous porous material, the resin supply material and the preform were easily prepared. In Example 5, a material having a higher handling characteristic and higher workability was obtained by using as a resin a thermoplastic resin that is in a solidified state at 23° C. In Example 6, the material was confirmed to be not only excellent in handling characteristic at 23° C., but also suitable for a molding method capable of molding even a complicated shape at a low pressure as in vacuum-pressure molding. By using such a material, a fiber-reinforced resin was easily produced without use of additional subsidiary materials.

Comparative Example 1

Except that only the resin (b-1) was used in place of the resin supply material, the same procedure as in Example 1 was carried out. Since only the resin (b-1) was used (i.e. the continuous porous material was not used), it took much time for lamination work due to, for example, occurrence of breakage in a resin film in conveyance of the film for lamination, and many wrinkles were generated in the film. The obtained fiber-reinforced resin had non-impregnated portions because a large amount of the resin (b-1) flowed out in the surface direction rather than being impregnated into the base material (B-1), and thus it was unable to obtain a desired fiber-reinforced resin.

Comparative Example 2

Except that the resin supply material (A-5) was used, the same procedure as in Example 1 was carried out. The continuous porous material (a-4) was broken during preparation of the resin supply material (A-5), and thus it was difficult to prepare the homogeneous resin supply material (A-5). Careful handling was required in lamination, and thus it took much time for lamination work although not so much time as in Comparative Example 1. A pressure during molding caused the continuous porous material (a-4) to flow out in the surface direction so that the resin was not sufficiently supplied to the base material (B-1), and thus it was unable to obtain a desired fiber-reinforced resin.

Comparative Example 3

Except that the resin supply material (A-6) was used, the same procedure as in Example 1 was carried out. The resin was not impregnated into the central part of the continuous porous material (a-5) during preparation of the resin supply material (A-6), and thus the resin supply material (A-6) had had a large amount of resin on both surfaces. This may be because the continuous porous material was a closed-cell foam having isolated cells, and the continuous porous material changed in thickness under pressure like a sponge so that it was unable to absorb (hold) the resin. Further, the continuous porous material (a-5) was collapsed under pressure during molding, and thus the obtained fiber-reinforced resin was in the form of two fiber-reinforced resins separated at the inside of the continuous porous material (a-5).

Comparative Example 4

Except that the resin supply material (A-7) was used, the same procedure as in Example 1 was carried out to prepare a fiber-reinforced resin. The characteristics of the obtained fiber-reinforced resin are as shown in Table 10. The continuous porous material (a-6) in the resin supply material (A-7) was melted during molding of the preform so that the shape of the continuous porous material before molding was not maintained, and gap portions in the porous material were collapsed so that the continuous porous material had a shape similar to a resin sheet. Thus, it was unable to exhibit sufficient dynamic characteristics.

TABLE 6

| Continuous porous material | | a-1 | a-2 | a-3 | a-4 | a-5 | a-6 |
|---|---|---|---|---|---|---|---|
| 23° C. Tensile strength | MPa | 1.10 | 16.00 | 16.00 | 0.20 | 0.30 | 0.11 |
| Tensile strength ratio: $\sigma r(=\sigma mt/\sigma rt)$ | — | — | 0.91 | 0.88 | 0.88 | 0.90 | 0.93 | 0.09 |
| Weight per unit area: M | g/m$^2$ | 120 | 100 | 300 | 100 | 255 | 175 |
| Tensile strength ratio at 23° C.: $\sigma rtr (=\sigma rt/\sigma rtmax)$ | — | — | 0.85 | 0.98 | 0.98 | 0.77 | 0.91 | 0.95 |
| Elasticity ratio: Eb | — | 0.95 | 0.98 | 0.98 | 0.60 | 0.50 | 0.98 |
| Thickness: tb | mm | 1.5 | 3.0 | 8.8 | 5.0 | 1.5 | 5.0 |
| Melting point (softening point) | ° C. | 280 | — | — | — | 115 | 115 |
| 130° C. Tensile strength: $\sigma mt$ | MPa | 1.00 | 14.00 | 14.00 | 0.18 | 0.28 | 0.01 |
| Constituent material | — | PPS | CF | CF | CF | Urethane | Urethane |

TABLE 7

| Resin | | b-1 | b-2 |
|---|---|---|---|
| 23° C. Elastic modulus: Ert | MPa | 1.1 | 1.4 |
| Kind of resin | — | Epoxy | PP |

TABLE 8

| Resin supply material | | A-1 | A-2 | A-3 | A-4 | A-5 | A-6 | A-7 |
|---|---|---|---|---|---|---|---|---|
| Structure Continuous porous material | — | a-1 | a-2 | a-3 | a-2 | a-4 | a-5 | a-6 |
| Resin | — | b-1 | b-1 | b-1 | b-2 | b-1 | b-1 | b-1 |
| Thickness: T | mm | 1.3 | 2.0 | 3.9 | 6.0 | 3.0 | 1.5 | 5.0 |
| Volume content of continuous porous material: Vpi | % | 6.6 | 4.3 | 11.9 | 3.3 | 5.8 | 13.6 | 9.7 |
| Mass content of continuous porous material: Wpi | % | 7.4 | 6.3 | 16.7 | 6.3 | 6.3 | 14.5 | 10.4 |

TABLE 9

| | | Example 1 | Example 2 | Example 3 | Example 4 | Example 5 | Example 6 |
|---|---|---|---|---|---|---|---|
| Preform Structure | — | (B-1) | (B-1) | (B-1) | (A-2) | (B-1) | (B-1) |
| | — | (B-1) | (B-1) | (B-1) | (B-1) | (B-1) | (B-1) |
| | — | (A-1) | (A-2) | (A-3) | (B-1) | (A-4) | (A-2) |
| | — | (B-1) | (B-1) | (B-1) | (B-1) | (B-1) | (B-1) |
| | — | (B-1) | (B-1) | (B-1) | (B-1) | (B-1) | (B-1) |
| | — | | | | (A-2) | | |
| Handling characteristic | — | ○ | ○ | ○ | ○ | ○ | ○ |
| Fiber-reinforced resin | | | | | | | |
| Molding method | — | Press | Press | Press | Press | Press | Vacuum-pressure |
| Resin change ratio: P | % | 0.27 | 0.28 | 0.66 | 0.28 | 0.25 | 0.37 |
| Resin-impregnated state | — | ○ | ○ | ○ | ○ | ○ | ○ |
| Bending elastic modulus | GPa | 25 | 34 | 26 | 28 | 29 | 33 |

TABLE 10

| | | Comparative Example 1 | Comparative Example 2 | Comparative Example 3 | Comparative Example 4 |
|---|---|---|---|---|---|
| Preform Structure | — | (B-1) | (B-1) | (B-1) | (B-1) |
| | — | (B-1) | (B-1) | (B-1) | (B-1) |
| | — | (b-1) | (A-5) | (A-6) | (A-7) |
| | — | (B-1) | (B-1) | (B-1) | (B-1) |
| | — | (B-1) | (B-1) | (B-1) | (B-1) |
| Handling characteristic | — | Δ | x | ○ | ○ |

TABLE 10-continued

|  | | Comparative Example 1 | Comparative Example 2 | Comparative Example 3 | Comparative Example 4 |
|---|---|---|---|---|---|
| Fiber-reinforced resin | | | | | |
| Molding method | — | — | Press | Press | Press | Press |
| Resin change ratio: P | % | — | — | — | 0.23 |
| Resin-impregnated state | — | x | x | x | ○ |
| Bending elastic modulus | GPa | Measurement impossible | Measurement impossible | Measurement impossible | 20 |

Third Construction

Resin Supply Material

The resin supply material is a resin supply material including at least a continuous porous material and a resin. As shown in FIG. 1, a resin supply material 1 allows a fiber-reinforced resin to be produced by laminating the resin supply material 1 and a base material 2 to prepare a preform 3, heating and pressurizing the preform 3 in, for example, a closed space, and supplying a resin from the resin supply material 1 to the base material 2. The resin serves as a matrix resin for the fiber-reinforced resin.

The preform 3 means a laminate obtained by laminating and integrating the resin supply material 1 and the base material 2, and examples thereof may include a sandwich laminate in which an outermost layer of a laminate obtained by laminating and integrating a predetermined number of resin supply materials 1 is sandwiched between base materials 2; an alternating laminate in which resin supply materials 1 and base materials 2 are alternately laminated; and a combination thereof. Formation of the preform 3 beforehand is preferred because the base material 2 can be quickly and more uniformly impregnated with a resin in a process of producing a fiber-reinforced resin.

In a method of producing a fiber-reinforced resin using the resin supply material 1, it is preferred that a resin can be supplied from the resin supply material 1 to the base material 2 while generation of voids is prevented as much as possible and, therefore, it is preferred to use a press molding method or a vacuum-pressure molding method. A metal mold to be used may be a double-sided mold such as a closed mold composed of a rigid body, or a single-sided mold. In the latter case, the preform 3 can also be disposed between a flexible film and a rigid open mold (where the preform 3 is pressurized because a space between the flexible film and the rigid open mold is depressurized as compared to the outside).

Continuous Porous Material

The continuous porous material may be in the form of not only a porous sheet, but also, for example, a fiber base material such as a unidirectional base material, a fabric base material or a web which is formed of fibers. The fibers are preferably in the form of discontinuous fibers from the viewpoint of a resin supply characteristic. The discontinuous fibers may be, for example, those in a bundle shape or monofilament shape, and are preferably in the form of a web in which gaps to be impregnated with a resin existing between the fibers. The form and the shape of the web are not limited and, for example, different kinds of reinforcing fibers may be mixed, fibers may be sealed together by other component, or fibers may be bonded to a resin component. As a preferred form of easily producing a web in which fibers are dispersed, mention may be made of, for example, a base material which is in the form of a non-woven fabric obtained by a dry method or a wet method and in which fibers are sufficiently opened, and monofilaments are bonded together by a binder composed of an organic compound.

Preferably, fibers in the continuous porous material formed of fibers that are preferably used are bonded together by a binder. Accordingly, the handling characteristic and productivity and workability are improved, and the network structure of the continuous porous material can be retained. The binder is not particularly limited, and examples of the binder that is preferably used include thermoplastic resins such as polyvinyl alcohol, ethylene-propylene copolymers, ethylene-vinyl acetate copolymers, polyvinyl chloride, polyvinylidene chloride, polyvinyl acetate, polycarbonate resins, styrene-based resins, polyamide-based resins, polyester-based resins, polyphenylene sulfide resins, modified polyphenylene ether resins, polyacetal resins, polyetherimide resins, polypropylene resins, polyethylene resins, fluororesins, thermoplastic acrylic resins, thermoplastic polyester resins, thermoplastic polyamideimide resins, acrylonitrile-butadiene copolymers, styrene-butadiene copolymers and acrylonitrile-styrene-butadiene copolymers; and thermosetting resins such as urethane resins, melamine resins, urea resins, thermosetting acrylic resins, phenol resins, epoxy resins and thermosetting polyester. A resin having at least one functional group selected from an epoxy group, a hydroxy group, an acrylate group, a methacrylate group, an amide group, a carboxyl group, a carboxylic acid, an acid anhydride group, an amino group and an imine group is preferably used from the viewpoint of the dynamic characteristics of the resulting fiber-reinforced resin. These binders may be used alone, or in combination of two or more thereof. The attaching amount of the binder is preferably 0.01% or more, more preferably 0.1% or more, still more preferably 1% or more. The attaching amount of the binder is preferably 20% or less, more preferably 15% or less, still more preferably 10% or less. When the attaching amount of the binder is more than 20%, much time may be required in a drying process, or resin impregnability may be deteriorated. When the attaching amount of the binder is less than 0.01%, it may be difficult to maintain the form of a web composed of fibers, leading to deterioration of the handling characteristic when the web is used. The attaching amount of the binder can be measured from a mass difference before and after application of the binder or by a burning method.

The mean fiber length of the fibers is preferably 0.1 mm or more, more preferably 1 mm or more, still more preferably 2 mm or more. The mean fiber length of the fibers is not particularly limited, but it is preferably 100 mm or less, more preferably 50 mm or less, still more preferably 10 mm or less from the viewpoint of isotropy of the continuous porous material and dispersibility of the fibers. Examples of the method of measuring the mean fiber length include a method in which fibers are directly extracted from a fiber base material, and measured by microscopic observation; and a method in which a resin in the resin supply material 1 is dissolved using a solvent capable of dissolving only the resin, the remaining fibers are separated by filtration, and measured by microscopic observation (dissolution method). When a solvent capable of dissolving a resin is not available, mention is made of, for example, a method in which only the resin is burned off in a temperature range over which the oxidative weight loss of fibers does not occur, and the fibers are separated, and measured by microscopic observation (burning method). The measurement can be performed by randomly selecting 400 fibers, determining the lengths of the reinforcing fibers to the order of 1 μm using an optical microscope, and determining fiber lengths and ratios thereof. In a comparison between the method in which reinforcing fibers are directly extracted from a fiber base material and the method in which fibers are extracted from the resin supply material 1 by a burning method or a dissolution method, there is no significant difference between the results obtained by the former method and the latter method as long as conditions are appropriately selected.

A mass per unit area (weight per unit area) of the continuous porous material is preferably 10 g/m² or more, more preferably 100 g/m² or more, still more preferably 300 g/m² or more. When the mass per unit area is less than 1 g/m², the resin support characteristic may be deteriorated, thus making it unable to hold an amount of resin required for molding. Further, in the process of producing the resin supply material 1, the handling characteristic may be poor, leading to deterioration of workability.

Resin

The kind of resin is not particularly limited, and either a thermosetting resin or a thermoplastic resin can be used. As the thermosetting resin, at least one selected from an epoxy resin, a vinyl ester resin, a phenol resin, a thermosetting polyimide resin, a polyurethane resin, a urea resin, a melamine resin and a bismaleimide resin. In addition to a single epoxy resin, a copolymer of an epoxy resin and a thermosetting resin, a modified product, a resin obtained by blending two or more kinds of resins and so on can be used. As the thermoplastic resin, at least one selected from polypropylene, polyethylene, polycarbonate, polyamide, polyester, polyarylene sulfide, polyphenylene sulfide, polyether ketone, polyether ether ketone, polyether ketone ketone, polyether sulfone, polyimide, polyamideimide, polyether imide and polysulfone is preferably used. A cyclic oligomer that is a precursor of any of these resins is also preferably used.

The viscosity of the resin during impregnation (molding) is preferably 1000 Pa·s or less, more preferably 100 Pa·s or less, still more preferably 10 Pa·s or less. When the viscosity is more than 1000 Pa·s, voids may be generated in the resulting fiber-reinforced resin because the later-described base material 2 is not sufficiently impregnated with the resin.

In the first construction, the thermal conductivity of a material that forms the continuous porous material in the resin supply material 1 is required to be 1.2 W/m·K or more, and is more preferably 5 W/m·K or more, still more preferably 10 W/m·K or more, particularly preferably 50 W/m·K or more. From the viewpoint of moldability, the thermal conductivity is preferably 1400 W/m·K or less.

In the first construction, when a porous sheet is used as the continuous porous material, for example, a sheet made of a porous material such as porous ceramic or porous silicon is preferably used.

When a fiber base material such as a unidirectional base material formed of fibers, a fabric base material or a web which is formed of fibers is used as the continuous porous material, examples of the fibers may include metal fibers such as fibers of gold, silver, copper, aluminum, nickel, iron, platinum, brass and stainless steel; polyacrylonitrile (PAN)-based carbon fibers, lignin-based carbon fibers, pitch-based carbon fibers and rayon-based carbon fibers; and inorganic fibers such as fibers of silicon carbide and silicon nitride. Fibers with the above-mentioned fibers subjected to a surface treatment may also be used.

As the carbon fibers, polyacrylonitrile (PAN)-based carbon fibers and pitch-based carbon fibers are preferably used from the viewpoint of a thermal conductivity. Particularly PAN-based carbon fibers having a strand elastic modulus of 200 GPa or more, more preferably 350 GPa or more are preferably used, and pitch-based carbon fibers having an elastic modulus of 400 GPa or more are more preferably used.

A thermal conductivity of the material that forms the porous continuous material can be measured by the following method. When the continuous porous material is in the form of a porous sheet, a thermal diffusion factor of a solid body composed of the same material as that of the continuous porous material is measured by a flash method using a thermal diffusion factor measurement apparatus (e.g. LFA 447 (Nanoflash) manufactured by NETZSCH Company). A density of the solid body is measured by an Archimedes method using an electronic analysis balance (e.g. AEL-200 manufactured by Shimadzu Corporation), and a specific heat capacity of the solid body is measured by a DSC method using a differential scanning calorimeter (e.g. DSC-7 manufactured by PerkinElmer, Inc.). The thermal conductivity (W/m·K) is calculated from a product of the thermal diffusion factor, density and specific heat capacity measured as described above.

When the continuous porous material is in the form of a fiber base material formed of fibers, a thermal diffusion factor of the fibers that form the fiber base material is measured by an optical alternating current method using a thermal diffusion factor measurement apparatus (e.g. Laser-PIT manufactured by ULVAC RIKO, Inc.). The density of the fibers is measured by a gas exchange method using a dry automatic density meter (e.g. AccuPyc 1330-03 manufactured by Micromeritics Company) and an electronic analysis balance (e.g. AEL-200 manufactured by Shimadzu Corporation), and a specific heat capacity of the fibers is measured by a DSC method using a differential scanning calorimeter (e.g. DSC-7 manufactured by PerkinElmer, Inc.). The thermal conductivity (W/m·K) is calculated from a product of the thermal diffusion factor, density and specific heat capacity measured as described above.

In the second construction, the resin supply material 1 is required to contain a filler having a thermal conductivity of 1.2 W/m·K or more, and the thermal conductivity of the filler is preferably 10 W/m·K or more, more preferably 50 W/m·K or more, still more preferably 200 W/m·K or more. It suffices that the thermal conductivity of the filler is 3000 W/m·K or less.

In the second construction, when a porous sheet is used as the continuous porous material, examples of the porous sheet may include organic porous sheets made of a porous material such as a urethane foam, a melamine foam, a foamed PP sheet, foamed polyethylene, foamed polystyrene or foamed polyester; and inorganic porous sheets made of a porous material such as a silicone foam, porous ceramic, porous silicon or porous glass.

Examples of the filler may include metal-based fillers such as copper, silver, gold, aluminum and nickel; carbon-based fillers such as graphite, graphene, carbon black, carbon nanotubes, carbon fibers and ultrathin carbon fibers; and ceramic-based fillers such as boron nitride, aluminum nitride and aluminum oxide.

The number average particle diameter of the filler is preferably 100 µm or less, more preferably 60 µm or less, particularly preferably 20 µm or less. When the average particle diameter of the filler is in the above-mentioned range, the resin may be quickly supplied without hindering the flow of the resin during molding. The number average particle diameter of the filler is preferably 10 nm or more. When the number average particle diameter of the filler is 10 nm or more, the cohesive force of the filler is adjusted so that an aggregate with a plurality of filler particles bonded together can be dispersed in the resin.

The number average particle diameter of the filler is a value determined in the following manner: the filler is observed with a field emission type scanning electron microscope (FE-SEM), a diameter of a circumscribed circle with each of randomly selected 60 particles is measured, and an average of the measured diameters is calculated.

A volume content Vc of the filler in the resin is preferably 1% to 30% (inclusive) from the viewpoint of a balance between the amount of the resin held by the resin supply material 1 and the thermal conductivity. In the first aspect, it is preferred that the resin supply material 1 of the present invention contains the filler. The resin supply material 1 exhibits a more excellent effect when meeting the requirements for both the first aspect and the second aspect.

In the resin supply material 1, a resin mass change ratio P in the resin supply material 1 before and after molding as expressed by the following formula is preferably 0.03 or more, more preferably 0.05 or more, still more preferably 0.08 or more. To cause the resin to flow from the resin supply material 1 to the base material 2, so that a fiber-reinforced resin having a reduced number of voids is obtained, the change ratio P is preferably 0.99 or less, more preferably 0.7 or less, still more preferably 0.5 or less. A mass of resin Wr2 in the resin supply material 1 after molding can be determined by a burning method after only the resin supply material 1 is taken out by polishing, cutting or the like.

$$P = Wr2/Wr1$$

Wr1: mass of resin (g) in resin supply material before molding

Wr2: mass of resin (g) in resin supply material after molding

By using this resin supply material 1, the resin can be supplied to a larger amount of the base material 2, so that the degree of design freedom and dynamic characteristics of the fiber-reinforced resin can be improved.

The method of preparing the resin supply material 1 is not particularly limited, and examples thereof may include a method in which a continuous porous material is immersed in a liquid resin to be impregnated with the resin; a method in which a continuous porous material and a resin are pressurized using a press flat plate or a roll under a heating condition for reducing the viscosity of the resin so that the continuous porous material is impregnated with the resin; and a method in which a continuous porous material and a resin are enclosed under a reduced-pressure condition so that air existing in the continuous porous material is replaced by the resin to impregnate the continuous porous material with the resin.

The resin supply material 1 includes a continuous porous material and a resin, and is preferably in the form of a sheet. The thickness of the base material in the form of a sheet is preferably 0.5 mm or more, more preferably 1 mm or more, still more preferably 1.5 mm or more from the viewpoint of a resin supply characteristic and dynamic characteristics. From the viewpoint of a handling characteristic and moldability, the thickness of the base material in the form of a sheet is preferably 100 mm or less, more preferably 60 mm or less, still more preferably 30 mm or less.

A mass content Wpi of the continuous porous material in the resin supply material 1 is preferably 0.5% or more, more preferably 1.0% or more, still more preferably 1.5% or more. When the mass content Wpi is less than 0.5%, the amount of the resin is excessively large with respect to the continuous porous material, the continuous porous material cannot hold the resin, or a large amount of the resin flows to the outside during molding. The mass content Wpi is not particularly limited, but it is preferably 30% or less, more preferably 22% or less, still more preferably 15% or less. When the mass content Wpi is more than 30%, the fiber-reinforced resin may have a large number of voids due to poor impregnation of the resin into the base material 2.

A volume content Vpi of the continuous porous material in the resin supply material 1 is preferably 0.3% or more, more preferably 0.6% or more, still more preferably 1% or more. When the volume content Vpi is less than 0.5%, the amount of the resin is excessively large with respect to the continuous porous material, the continuous porous material cannot hold the resin, or a large amount of the resin flows to the outside during molding. The volume content Vpi is not particularly limited, but it is preferably 20% or less, more preferably 15% or less, still more preferably 10% or less. When the volume content Vpi is more than 20%, the fiber-reinforced resin may have a large number of voids due to poor impregnation of the resin into the base material 2.

Base Material

The preform includes the resin supply material 1 and the base material 2. Usually, the base material 2 does not contain a matrix resin, i.e. the base material is in a dry state. The base material 2 to be used in the preform 3 is a fiber base material composed of reinforcing fibers, and is preferably at least one selected from a fabric base material, a unidirectional base material and a mat base material each composed of reinforcing fibers. Specifically, a single fabric foundation cloth composed of continuous fibers or a laminate of such fabric foundation cloths, a product obtained by stitching and integrating the fabric foundation cloths by a stitch thread, a fiber structure such as a three-dimensional fabric or a braided product, a non-woven fabric formed of discontinuous fibers, or the like is preferably used. The continuous reinforcing fiber means a carbon fiber in which a carbon fiber bundle is drawn and aligned in a continuous state without cutting the reinforcing fiber into short fibers.

To obtain a fiber-reinforced resin having high dynamic characteristics, it is preferred that a fabric base material or unidirectional base material composed of continuous reinforcing fibers is used as the base material 2, and to increase the thermosetting resin impregnation rate to improve productivity of the fiber-reinforced resin, it is preferred that a mat base material composed of discontinuous fibers is used as the base material 2. The base material 2 may be a single base material, or one obtained by laminating a plurality of base materials, or may be one obtained by partially laminating base materials or laminating different base materials according to characteristics required for the preform or the fiber-reinforced resin.

Method of Producing Fiber-Reinforced Resin

Examples of the method of producing a fiber-reinforced resin using the resin supply material 1 include a method of producing a fiber-reinforced resin in which a fiber-reinforced resin is molded by heating and pressurizing the preform 3 to supply a resin from the resin supply material 1 to the base material 2. A preform including the resin supply material 1 and the base material 2 is prepared, and set on a metal mold. The resin is made flowable by heat from the metal mold (in a thermosetting resin, the resin has a reduced viscosity until curing of the resin; and in a thermoplastic resin, the resin is melted or softened), and the preform 3 is pressurized to supply the resin to the base material 2. The pressurization method is preferably press molding or vacuum-pressure molding. For the metal mold temperature here, the temperature during supply of the resin and the temperature during curing may be the same, or different when the resin is a thermosetting resin. When the resin is a thermoplastic resin, the temperature during supply of the resin is preferably higher than the melting point of the resin by 10° C. or more. The temperature at which the resin is solidified after supply of the resin is preferably lower than the melting point of the resin by 10° C. or more, more preferably by 30° C. or more, still more preferably 50° C. or more. The metal mold to be used for molding may be a double-sided mold composed of a rigid body, or a single-sided mold. In the latter case, the preform is disposed between a flexible film and the single-sided metal mold, and the pressure a space between the flexible film and the single-sided metal mold is made lower than the pressure in the outside environment to bring the preform into a pressurized state). When the resin is a thermosetting resin, heating to a temperature at which the thermosetting resin is cured is performed after molding as necessary in addition to heating during molding so that the thermosetting resin is cured to obtain a fiber-reinforced resin. When the resin is a thermoplastic resin, the resin melted by heating during molding is cooled to solidify the resin so that a fiber-reinforced resin is obtained. The resin supply material 1 has an excellent thermal conductivity so that temperature unevenness occurring in the material during molding can be reduced, and thus the resin supply material 1 is also suitable for molding of a thick article.

EXAMPLES

Hereinafter, our resin supply, materials, preforms and methods will be described more in detail by way of examples. This disclosure is not limited to these examples.
Evaluation Method
Measurement of Thermal Conductivity of Fibers The thermal diffusion factor was measured under the following conditions by an optical alternating current method. Two measurements were made with a different sample for each measurement, and an average of the measured values was defined as a thermal diffusion factor.

Measurement apparatus: thermal diffusion factor measurement apparatus LaserPIT manufactured by ULVAC RIKO, Inc.
Irradiation light: semiconductor laser
Temperature sensor: E thermocouple (line diameter: 100 μm, coated with silver paste)
Atmosphere: vacuum
Measurement temperature: 25° C.
Measurement direction: fiber axis direction
The density was measured under the following conditions by a gas exchange method. Two measurements were made with a different sample for each measurement, and an average of the measured values was defined as a density.

Measurement apparatus: dry automatic density meter AccuPyc 1330-03 manufactured by Micromeritics Company
Balance: electronic analysis balance AEL-200 manufactured by Shimadzu Corporation
Measurement temperature: 25° C.
Filling gas: helium
The specific heat capacity was measured under the following conditions by DSC method. Two measurements were made with a different sample for each measurement, and an average of the measured values was defined as a specific heat capacity.

Measurement apparatus: differential scanning calorimeter DSC-7 manufactured by PerkinElmer, Inc.
Temperature elevation rate: 10° C./minute
Standard sample: sapphire ($\alpha$-$Al_2O_3$)
Atmosphere: dry nitrogen flow
Sample container: aluminum container ($\phi$6 mm×1 mm)
The thermal conductivity (W/m·K) of fibers was calculated from a product of the thermal diffusion factor, density and specific heat capacity of the fibers.
Measurement of Thermal Conductivity of Fiber-Reinforced Resin The thermal conductivity was measured in accordance with ASTM E530 using GH-1S manufactured by ULVAC RIKO, Inc. Four test pieces were cut out in a size of 20 mm×3 mm from each of fiber-reinforced resins (E-1 to E-15) as described later, and were turned by 90° such that the measurement direction matched the side of 3 mm, i.e. the fiber direction, and the four test pieces were brought into contact with one another to form a rectangular solid shape.
Thickness of Resin Supply Material The thickness of the resin supply material was measured in accordance with a method for measurement of a thickness as specified in JIS-L1913 (2010) "Method for Testing General Non-Woven Fabrics".
Impregnability of Resin in Fiber-Reinforced Resin It was determined that molding was impossible (x) when the ratio of a resin-non-impregnated portion existing in the surface layer of the molded article was 30% or more, and otherwise, it was determined that molding was possible (○). The evaluation results are as shown in Table 11.
Materials
Fibers
  Fibers (d-1) (Carbon Fibers)
  From a copolymer mainly composed of PAN, continuous carbon fibers including total 12,000 monofilaments were prepared by performing spinning, a firing treatment and a surface oxidation treatment. The continuous carbon fibers had characteristics as shown below.
    Monofilament diameter: 7 μm
    Mass per unit length: 0.8 g/m
    Specific gravity: 1.8
    Tensile strength: 4600 MPa
    Tensile elastic modulus: 220 GPa
    Thermal conductivity: 12.3 W/m·K
  Fibers (d-2) (Carbon Fibers)
  From a copolymer mainly composed of PAN, continuous carbon fibers including total 12,000 monofilaments were prepared by performing spinning, a firing treatment and a surface oxidation treatment. The continuous carbon fibers had characteristics as shown below.
    Monofilament diameter: 5 μm
    Mass per unit length: 0.5 g/m
    Specific gravity: 1.8
    Tensile strength: 4400 MPa
    Tensile elastic modulus: 380 GPa
    Thermal conductivity: 61.3 W/m·K Filler
　Filler (c-1)
　　V325F ($Al_2O_3$, manufactured by Nippon Light Metal Company, Ltd., number average particle diameter: 12 μm, purity of $Al_2O_3$: 99.7%, thermal conductivity: 30 W/m·K)
　Filler (c-2)
　　UHP-1K (boron nitride, manufactured by Showa Denko K.K., number average particle diameter: 8 μm, purity of boron nitride: 99.9%, thermal conductivity: 60 W/m·K)
　Filler (c-3)
　　FLZ-1 (aluminum nitride, manufactured by Toyo Aluminium K.K., number average particle diameter: 9.8 μm, thermal conductivity: 300 W/m·K)
Resin
　Resin (b-1)
　　An resin (b-1) was prepared using 40 parts by mass of "jER (registered trademark)" 1007 (manufactured by Mitsubishi Chemical Corporation), 20 parts by mass of "jER (registered trademark)" 630 (manufactured by Mitsubishi Chemical Corporation), 40 parts by mass of "EPICLON (registered trademark)" 830 (manufactured by DIC Corporation), DICY7 (manufactured by Mitsubishi Chemical Corporation) as a curing agent in an amount of 0.9 equivalents in terms of active hydrogen groups based on the amount of epoxy groups in all the epoxy resin components, and 2 parts by mass of DCMU99 (manufactured by HODOGAYA CHEMICAL CO., LTD.) as a curing accelerator.
　　Using a reverse roll coater, the obtained resin (b-1) was applied onto a release paper to prepare resin films (b-1) with masses per unit area of 50 g/m² and 100 g/m², respectively. Any of these films was laminated according to a purpose so that the mass per unit area of the film was changed.
Production of Mixture of Filler and Resin
　Mixture (1)
　　The filler (c-1) was added to the resin (b-1) in such a manner that the volume content of the filler (c-1) was 6.0%, and the mixture was heated at 60° C. for 2 hours so that the viscosity of the resin (b-1) fell within a range suitable for kneading. The mixture was kneaded at 1600 rpm for 10 minutes by a planetary centrifugal mixer (manufactured by THINKY CORPORATION) to prepare a mixture (1).
　　Using a reverse roll coater, the obtained mixture (1) was applied onto a release paper to prepare mixture films (1) with masses per unit area of 50 g/m² and 100 g/m², respectively. Any of these films was laminated according to a purpose so that the mass per unit area of the film was changed.
　Mixture (2)
　　The filler (c-2) was added to the resin (b-1) in such a manner that the volume content of the filler (c-2) was 7.2%, and the mixture was heated at 60° C. for 2 hours, so that the viscosity of the resin (b-1) fell within a range suitable for kneading. The mixture was kneaded at 1600 rpm for 10 minutes by a planetary centrifugal mixer (manufactured by THINKY CORPORATION) to prepare a mixture (2).
　　Using a reverse roll coater, the obtained mixture (2) was applied onto a release paper to prepare mixture films (2) with masses per unit area of 50 g/m² and 100 g/m², respectively. Any of these films was laminated according to a purpose so that the mass per unit area of the film was changed.
　Mixture (3)
　　The filler (c-3) was added to the resin (b-1) such that the volume content of the filler (c-3) was 7.1%, and the mixture was heated at 60° C. for 2 hours so that the viscosity of the resin (b-1) fell within a range suitable for kneading. The mixture was kneaded at 1600 rpm for 10 minutes by a planetary centrifugal mixer (manufactured by THINKY CORPORATION) to prepare a mixture (3).
　　Using a reverse roll coater, the obtained mixture (3) was applied onto a release paper to prepare mixture films (3) with masses per unit area of 50 g/m² and 100 g/m², respectively. Any of these films was laminated according to a purpose so that the mass per unit area of the film was changed.
Continuous Porous Material
　Continuous Porous Material (a-1)
　　The fibers (d-1) were cut to a predetermined length by a cartridge cutter to prepare chopped carbon fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped carbon fibers. The production apparatus includes a cylindrical container as a dispersion tank that includes an opening cock in the lower part of the container and has a diameter of 1000 mm; and a linear transportation section (inclination angle: 30 degrees) that connects the dispersion tank and a papermaking tank. A stirrer is attached to an opening section on the upper surface of the dispersion tank, and the chopped carbon fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a carbon fiber base material (papermaking base material) connects to the mesh conveyor. In papermaking, the carbon fiber concentration in the dispersion liquid was adjusted to adjust the mass per unit area. About 5% by mass of a polyvinyl alcohol aqueous solution (KURARAY POVAL, manufactured by KURARAY CO., LTD.) as a binder was deposited on the carbon fiber base material subjected to papermaking, and was dried in a drying furnace at 140° C. for 1 hour to prepare a desired carbon fiber web. The mass per unit area was 100 g/m², and the mean fiber length was 5.8 mm. The web obtained here was designated as a continuous porous material (a-1).
　Continuous Porous Material (a-2)
　　Except that the fibers (d-2) were used, the same procedure as the continuous porous material (a-1) was carried out to prepare a continuous porous material (a-2).
　Continuous Porous Material (a-3)
　　FEO-030 (glass fiber web manufactured by ORIBEST CO., LTD., 30 g/m², thermal conductivity of fibers: 1.0 W/m·K)
Resin Supply Material
　Resin Supply Material (A-1)
　　A resin supply material (A-1) was prepared by laminating a laminate (200 g/m²) of the continuous porous material (a-1) and 1300 g/m² of a resin film (1) to obtain a laminate of resin film (1)/continuous porous material (a-1)/resin film (1), and heating the laminate under a pressurizing condition at a surface pressure of 0.1 MPa for 1.5 hours in a press machine with the temperature adjusted to 70° C. In the resin supply material (A-1), the volume content Vpi of the continuous porous material (a-1) was 4.9%, the mass content Wpi of the continuous porous material (a-1) was 7.1%, and the thickness of the continuous porous material (a-1) was 2.3 mm.
　Resin Supply Material (A-2)
　　A resin supply material (A-2) was prepared by laminating a laminate (200 g/m²) of the continuous porous material (a-2) and 1300 g/m² of a resin film (1) to obtain a laminate of resin film (1)/continuous porous material (a-2)/resin film (1), and heating the laminate under a pressurizing condition at a surface pressure of 0.1 MPa for 1.5 hours in a press machine with the temperature adjusted to 70° C. In the resin supply material (A-2), the volume content Vpi of the continuous porous material (a-2) was 4.9%, the mass content Wpi of the continuous porous material (a-2) was 7.1%, and the thickness of the continuous porous material (a-2) was 2.3 mm.

Resin Supply Material (A-3)

A resin supply material (A-3) was prepared by laminating a laminate (200 g/m$^2$) of the continuous porous material (a-2) and 1450 g/m$^2$ of a mixture film (1) to obtain a laminate of mixture film (1)/continuous porous material (a-2)/mixture film (1), and heating the laminate under a pressurizing condition at a surface pressure of 0.1 MPa for 1.5 hours in a press machine with the temperature adjusted to 70° C. In the resin supply material (A-3), the volume content Vpi of the continuous porous material (a-2) was 4.9%, the mass content Wpi of the continuous porous material (a-2) was 6.6%, and the thickness of the continuous porous material (a-2) was 2.2 mm.

Resin Supply Material (A-4)

A resin supply material (A-4) was prepared by laminating a laminate (200 g/m$^2$) of the continuous porous material (a-2) and 1450 g/m$^2$ of a mixture film (2) to obtain a laminate of mixture film (2)/continuous porous material (a-2)/mixture film (2), and heating the laminate under a pressurizing condition at a surface pressure of 0.1 MPa for 1.5 hours in a press machine with the temperature adjusted to 70° C. In the resin supply material (A-4), the volume content Vpi of the continuous porous material (a-2) was 4.9%, the mass content Wpi of the continuous porous material (a-2) was 6.4%, and the thickness of the continuous porous material (a-2) was 2.3 mm.

Resin Supply Material (A-5)

A resin supply material (A-5) was prepared by laminating a laminate (200 g/m$^2$) of the continuous porous material (a-2) and 1450 g/m$^2$ of a mixture film (3) to obtain a laminate of mixture film (3)/continuous porous material (a-2)/mixture film (3), and heating the laminate under a pressurizing condition at a surface pressure of 0.1 MPa for 1.5 hours in a press machine with the temperature adjusted to 70° C. In the resin supply material (A-5), the volume content Vpi of the continuous porous material (a-2) was 4.9%, the mass content Wpi of the continuous porous material (a-2) was 6.5%, and the thickness of the continuous porous material (a-2) was 2.3 mm.

Resin Supply Material (A-6)

A resin supply material (A-6) was prepared by laminating a laminate (300 g/m$^2$) of the continuous porous material (a-3) and 1450 g/m$^2$ of the mixture film (1) to obtain a laminate of mixture film (1)/continuous porous material (a-3)/mixture film (1), and heating the laminate under a pressurizing condition at a surface pressure of 0.1 MPa for 1.5 hours in a press machine with the temperature adjusted to 70° C. In the resin supply material (A-6), the volume content Vpi of the continuous porous material (a-3) was 5.6%, the mass content Wpi of the continuous porous material (a-3) was 9.4%, and the thickness of the continuous porous material (a-3) was 2.3 mm.

Resin Supply Material (A-7)

A resin supply material (A-7) was prepared by laminating a laminate (300 g/m$^2$) of the continuous porous material (a-3) and 1450 g/m$^2$ of the mixture film (2) to obtain a laminate of resin (3)/continuous porous material (a-3)/mixture film (2), and heating the laminate under a pressurizing condition at a surface pressure of 0.1 MPa for 1.5 hours in a press machine with the temperature adjusted to 70° C. In the resin supply material (A-7), the volume content Vpi of the continuous porous material (a-3) was 5.6%, the mass content Wpi of the continuous porous material (a-3) was 9.2%, and the thickness of the continuous porous material (a-3) was 2.3 mm.

Resin Supply Material (A-8)

A resin supply material (A-8) was prepared by laminating a laminate (300 g/m$^2$) of the continuous porous material (a-3) and 1450 g/m$^2$ of the mixture film (3) to obtain a laminate of resin (3)/continuous porous material (a-3)/mixture film (3), and heating the laminate under a pressurizing condition at a surface pressure of 0.1 MPa for 1.5 hours in a press machine with the temperature adjusted to 70° C. In the resin supply material (A-8), the volume content Vpi of the continuous porous material (a-3) was 5.2%, the mass content Wpi of the continuous porous material (a-3) was 9.4%, and the thickness of the continuous porous material (a-3) was 2.3 mm.

Resin Supply Material (A-9)

A resin supply material (A-9) was prepared by laminating a laminate (300 g/m$^2$) of the continuous porous material (a-3) and 1300 g/m$^2$ of a resin film (1) to obtain a laminate of resin film (1)/continuous porous material (a-3)/resin film (1), and heating the laminate under a pressurizing condition at a surface pressure of 0.1 MPa for 1.5 hours in a press machine with the temperature adjusted to 70° C. In the resin supply material (A-9), the volume content Vpi of the continuous porous material (a-3) was 5.4%, the mass content Wpi of the continuous porous material (a-3) was 10.7%, and the thickness of the continuous porous material (a-3) was 2.2 mm.

Base Material

Base Material (B-1)

"TORAYCA (registered trademark)" Cloth, CO6343B (manufactured by Toray Industries, Inc., plain fabric, weight per unit area: 198 g/m$^2$)

Base Material (B-2)

WE 110D 100 B56 (manufactured by Nitto Boseki Co., Ltd., plain fabric, weight per unit area: 97 g/m$^2$)

Example 1

A preform (D-1) was prepared by laminating the resin supply material (A-1) with a length of 100 mm and a width of 100 mm and the base material (B-1) to obtain a laminate of four base materials (B-1)/resin supply material (A-1)/four base materials (B-1). A fiber-reinforced resin (E-1) was prepared by molding the preform (D-1) by a molding method including the following steps.

(1) The preform (D-1) is preheated at a surface pressure of 0 at 70° C. for 10 minutes using a press machine.

(2) The preform (D-1) is pressurized at a surface pressure of 1 MPa.

(3) The laminate is heated to 150° C. at a rate of 3° C./minute, and then held for 40 minutes to be cured.

The characteristics of the obtained fiber-reinforced resin (E-1) are as shown in Table 11.

Example 2

Except that the resin supply material (A-2) was used, the same procedure as in Example 1 was carried out to prepare a preform (D-2) and a fiber-reinforced resin (E-2). The characteristics of the obtained fiber-reinforced resin (E-2) are as shown in Table 11.

Example 3

Except that the resin supply material (A-3) was used, the same procedure as in Example 1 was carried out to prepare a preform (D-3) and a fiber-reinforced resin (E-3). The characteristics of the obtained fiber-reinforced resin (E-3) are as shown in Table 11.

Example 4

Except that the resin supply material (A-4) was used, the same procedure as in Example 1 was carried out to prepare a preform (D-4) and a fiber-reinforced resin (E-4). The characteristics of the obtained fiber-reinforced resin (E-4) are as shown in Table 11.

Example 5

Except that the resin supply material (A-5) was used, the same procedure as in Example 1 was carried out to prepare a preform (D-5) and a fiber-reinforced resin (E-5). The characteristics of the obtained fiber-reinforced resin (E-5) are as shown in Table 11.

Example 6

A preform (D-6) was prepared by laminating the resin supply material (A-1) with a length of 100 mm and a width of 100 mm and the base material (B-2) to obtain a laminate of eleven layers of base materials (B-2)/resin supply material (A-1)/eleven layers of base materials (B-1). The preform (D-6) was molded in the same manner as in Example 1 to prepare a fiber-reinforced resin (E-6). The characteristics of the obtained fiber-reinforced resin (E-6) are as shown in Table 11.

Example 7

Except that the resin supply material (A-2) was used, the same procedure as in Example 6 was carried out to prepare a preform (D-7) and a fiber-reinforced resin (E-7). The characteristics of the obtained fiber-reinforced resin (E-7) are as shown in Table 11.

Example 8

Except that the resin supply material (A-3) was used, the same procedure as in Example 6 was carried out to prepare a preform (D-8) and a fiber-reinforced resin (E-8). The characteristics of the obtained fiber-reinforced resin (E-8) are as shown in Table 11.

Example 9

Except that the resin supply material (A-4) was used, the same procedure as in Example 6 was carried out to prepare a preform (D-9) and a fiber-reinforced resin (E-9). The characteristics of the obtained fiber-reinforced resin (E-9) are as shown in Table 11.

Example 10

Except that the resin supply material (A-5) was used, the same procedure as in Example 6 was carried out to prepare a preform (D-10) and a fiber-reinforced resin (E-10). The characteristics of the obtained fiber-reinforced resin (E-10) are as shown in Table 11.

Example 11

Except that the resin supply material (A-6) was used, the same procedure as in Example 6 was carried out to prepare a preform (D-11) and a fiber-reinforced resin (E-11). The characteristics of the obtained fiber-reinforced resin (E-11) are as shown in Table 11.

Example 12

Except that the resin supply material (A-7) was used, the same procedure as in Example 6 was carried out to prepare a preform (D-12) and a fiber-reinforced resin (E-12). The characteristics of the obtained fiber-reinforced resin (E-12) are as shown in Table 11.

Example 13

Except that the resin supply material (A-8) was used, the same procedure as in Example 6 was carried out to prepare a preform (D-13) and a fiber-reinforced resin (E-13). The characteristics of the obtained fiber-reinforced resin (E-13) are as shown in Table 11.

Example 14

Using the preform (D-6) in Example 6, a fiber-reinforced resin was prepared by a molding method including the following steps.

(1) The preform (D-6) is disposed on a metal plate, and covered with a film, and the metal plate and the film are sealed, and a space covered by the film is brought into a vacuum state ($10^{-1}$ Pa) using a vacuum pump.

(2) The preform is put in a dryer with the inside temperature adjusted to 70° C. while the preform is kept in the above-mentioned state, and preheating is performed for 10 minutes.

(3) The preform is heated to 150° C. at a rate of 3° C./minute, and then held for 40 minutes to be cured.

The characteristics of the obtained fiber-reinforced resin (E-14) are as shown in Table 11.

In Examples 1 to 14, the resin supply material was used to easily produce a fiber-reinforced resin without use of additional subsidiary materials. In Example 14, the material was confirmed to be suitable for a molding method capable of molding even a complicated shape at a low pressure as in vacuum-pressure molding. It was able to obtain a fiber-reinforced resin superior in thermal conductivity to the fiber-reinforced resin in Comparative Example 1.

Comparison of Examples 8 to 10 to Examples 11 to 13 shows that the fiber-reinforced resin exhibits a particularly excellent thermal conductivity when meeting the requirements for both the first and second construction. Comparison of Example 1 to Example 2 shows that the fiber-reinforced resin exhibits a particularly excellent thermal conductivity when the thermal conductivity of the material that forms the continuous porous material is 50 W/m·K or more.

Comparative Example 1

Except that the resin supply material (9) was used, the same procedure as in Example 6 was carried out to prepare a preform (D-15) and a fiber-reinforced resin (E-15). The characteristics of the obtained fiber-reinforced resin (E-15) are as shown in Table 11. In Comparative Example 1, it was able to easily produce a fiber-reinforced resin, but the fiber-reinforced resin was inferior in thermal conductivity to a fiber-reinforced resin prepared using the resin supply material.

TABLE 11

| | | | Example 1 | Example 2 | Example 3 | Example 4 | Example 5 | Example 6 | Example 7 | Example 8 |
|---|---|---|---|---|---|---|---|---|---|---|
| Resin supply material | Continuous porous material | — | a-1 | a-2 | a-2 | a-2 | a-2 | a-1 | a-2 | a-2 |
| | Thermal conductivity of continuous porous material | W/m·K | 12.3 | 61.3 | 61.3 | 61.3 | 61.3 | 12.3 | 61.3 | 61.3 |
| | Filler | — | — | — | C-1 | C-2 | C-3 | — | — | C-1 |
| | Thermal conductivity of Filler | W/m·K | — | — | 30 | 60 | 300 | — | — | 30 |
| | Volume content of resin in filler | % | 0 | 0 | 6 | 7.2 | 7.1 | 0 | 0 | 6 |
| | Volume content Vpi of continuous porous material | % | 4.9 | 4.9 | 4.9 | 4.9 | 4.9 | 4.9 | 4.9 | 4.9 |
| | Mass content Wpi of continuous porous material | % | 7.1 | 7.1 | 6.6 | 6.4 | 6.5 | 7.1 | 7.1 | 6.6 |
| | Thickness | mm | 2.3 | 2.3 | 2.2 | 2.3 | 2.3 | 2.3 | 2.3 | 2.2 |
| Base material | | — | B-1 | B-1 | B-1 | B-1 | B-1 | B-2 | B-2 | B-2 |
| Fiber-reinforced resin | Resin mass change ratio: P | % | 0.48 | 0.47 | 0.44 | 0.44 | 0.42 | 0.53 | 0.53 | 0.53 |
| | Resin impregnability | — | ○ | ○ | ○ | ○ | ○ | ○ | ○ | ○ |
| | Thermal conductivity | W/m·K | 3.2 | 10 | 10.2 | 10.6 | 13 | 1.1 | 3.5 | 3.7 |

| | | | Example 9 | Example 10 | Example 11 | Example 12 | Example 13 | Example 14 | Comparative Example 1 |
|---|---|---|---|---|---|---|---|---|---|
| Resin supply material | Continuous porous material | — | a-2 | a-2 | a-3 | a-3 | a-3 | a-1 | a-3 |
| | Thermal conductivity of continuous porous material | W/m·K | 61.3 | 61.3 | 1.0 | 1.0 | 1.0 | 12.3 | 1.0 |
| | Filler | — | C-2 | C-3 | C-1 | C-2 | C-3 | — | — |
| | Thermal conductivity of Filler | W/m·K | 60 | 300 | 30 | 60 | 300 | — | — |
| | Volume content of resin in filler | % | 7.2 | 7.1 | 6 | 7.2 | 7.1 | 0 | 0 |
| | Volume content Vpi of continuous porous material | % | 4.9 | 4.9 | 5.6 | 5.6 | 5.2 | 4.9 | 5.4 |
| | Mass content Wpi of continuous porous material | % | 6.4 | 6.5 | 9.4 | 9.2 | 9.4 | 7.1 | 10.7 |
| | Thickness | mm | 2.3 | 2.3 | 2.3 | 2.3 | 2.3 | 2.3 | 2.2 |
| Base material | | — | B-2 | B-2 | B-2 | B-2 | B-2 | B-2 | B-2 |
| Fiber-reinforced resin | Resin mass change ratio: P | % | 0.53 | 0.52 | 0.54 | 0.53 | 0.52 | 0.53 | 0.54 |
| | Resin impregnability | — | ○ | ○ | ○ | ○ | ○ | ○ | ○ |
| | Thermal conductivity | W/m·K | 4.2 | 5.8 | 0.49 | 0.81 | 1.8 | 1.1 | 0.38 |

INDUSTRIAL APPLICABILITY

A resin supply material and a method of producing a fiber-reinforced resin using the resin supply material are suitably used in sport applications, general industrial applications and aerospace applications. More specifically, the general industrial applications include electronic device members and repairing/reinforcing materials such as structural materials and sub-structural materials for automobiles, watercraft, windmills and so on, roof materials, and cases (housings) for IC trays and notebook personal computers. The aerospace applications include structural materials and sub-structural materials for aircrafts, rockets and artificial satellites.

The invention claimed is:

1. A resin supply material used for molding a fiber-reinforced resin, the resin supply material comprising a continuous porous material and a thermosetting resin, wherein the continuous porous material has a bending resistance $Gr_t$ of 10 mN·cm or more at 23° C., the resin supply material is a sheet having a thickness of 1.5 mm or more, and a bending resistance ratio $G_r$ of 0.7 or less, the bending resistance ratio $G_r$ being expressed by the formula:

$$Gr = Gm_t/Gr_t$$

$Gm_t$: bending resistance of continuous porous material at 70° C.

2. The resin supply material according to claim 1, wherein the continuous porous material has a bending length $Cr_t$ of 5 cm or more at 23° C.

3. The resin supply material according to claim 1, wherein the continuous porous material has a minimum tensile strength $\sigma min$ of 3 MPa or more.

4. The resin supply material according to claim 1, wherein the thermosetting resin has an elastic modulus $Er_t$ of 1 MPa or more at 23° C.

5. The resin supply material according to claim 1, wherein a change ratio P of the mass of the thermosetting resin before and after molding as expressed by the formula is 0.03 to 0.99

$$P = Wr2/Wr1$$

Wr1: mass of resin in resin supply material before molding

Wr2: mass of resin in resin supply material after molding.

6. The resin supply material according to claim 1, wherein when $\sigma min$ is a minimum tensile strength of the continuous porous material, and $\sigma o$ is a tensile strength in a direction orthogonal to a direction in which the continuous porous material has the minimum tensile strength, a tensile strength ratio $\sigma r$ of the continuous porous material as calculated from the formula is 1.0 to 1.2

$$\sigma r = \sigma o/\sigma min.$$

7. The resin supply material according to claim 1, wherein the continuous porous material is formed of reinforcing fibers.

8. The resin supply material according to claim 7, wherein the reinforcing fiber is at least one selected from a carbon fiber, a metal fiber, a silicon carbide fiber and a silicon nitride fiber.

9. A preform comprising the resin supply material according to claim 1, and a base material.

10. The preform according to claim 9, wherein the base material is at least one selected from a fabric base material, a unidirectional base material and a mat base material each composed of reinforcing fibers.

11. A method for producing a fiber-reinforced resin, the method comprising molding a fiber-reinforced resin by heating and pressurizing the preform according to claim 9 to supply the resin from the resin supply material to the base material.

12. The resin supply material according to claim 11, wherein the continuous porous material is formed of reinforcing fibers.

13. The resin supply material according to claim 1, wherein the continuous porous material is formed of reinforcing fibers, and the reinforcing fibers are bonded together by a binder with an attaching amount of the binder of 1% to 20%.

* * * * *